(12) United States Patent
Osaka et al.

(10) Patent No.: US 9,469,723 B2
(45) Date of Patent: Oct. 18, 2016

(54) PARTICLE MANUFACTURING METHOD, PARTICLES, AND PARTICLE MANUFACTURING APPARATUS

(71) Applicants: Keiko Osaka, Shizuoka (JP); Chiaki Tanaka, Shizuoka (JP); Taichi Nemoto, Shizuoka (JP)

(72) Inventors: Keiko Osaka, Shizuoka (JP); Chiaki Tanaka, Shizuoka (JP); Taichi Nemoto, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/432,655

(22) PCT Filed: Sep. 27, 2013

(86) PCT No.: PCT/JP2013/077007
§ 371 (c)(1),
(2) Date: Mar. 31, 2015

(87) PCT Pub. No.: WO2014/057869
PCT Pub. Date: Apr. 17, 2014

(65) Prior Publication Data
US 2015/0252141 A1    Sep. 10, 2015

(30) Foreign Application Priority Data

Oct. 10, 2012 (JP) ................. 2012-225116

(51) Int. Cl.
*C08G 63/08* (2006.01)
*C08G 63/78* (2006.01)
*C08G 64/30* (2006.01)
(Continued)

(52) U.S. Cl.
CPC ............... *C08G 63/08* (2013.01); *B01J 19/24* (2013.01); *C08G 63/78* (2013.01); *C08J 3/12* (2013.01); *C08J 3/122* (2013.01); *B01J 2219/24* (2013.01); *C08J 2367/04* (2013.01)

(58) Field of Classification Search
CPC ...... C08G 63/78; C08G 63/08; C08G 64/30; C08J 3/12; B01J 19/24
USPC ............................... 526/942; 528/355, 502 F
See application file for complete search history.

(56) References Cited

U.S. PATENT DOCUMENTS 6,190,773 B1    2/2001 Imamura et al.
2004/0072985 A1    4/2004 Lee et al.
(Continued)

FOREIGN PATENT DOCUMENTS

CN    104169323 A    11/2014
EP    2 365 016 A1    9/2011
(Continued)

OTHER PUBLICATIONS

International Search Report Issued Dec. 17, 2013 for counterpart International Patent Application No. PCT/JP2013/077007 filed Sep. 27, 2013.

(Continued)

*Primary Examiner* — Fred M Teskin
(74) *Attorney, Agent, or Firm* — Oblon, McClelland, Maier & Neustadt, L.L.P.

(57) ABSTRACT

A particle manufacturing method of the present invention includes: ring-opening-polymerizing a ring-opening-polymerizable monomer after bringing the ring-opening-polymerizable monomer into contact with a first compressible fluid; and granulating a polymer obtained in the ring-opening-polymerizing by jetting the polymer and the first compressible fluid.

10 Claims, 5 Drawing Sheets

(51) Int. Cl.
*C08J 3/12* (2006.01)
*B01J 19/24* (2006.01)

(56) References Cited

U.S. PATENT DOCUMENTS

| | | |
|---|---|---|
| 2011/0218301 A1 | 9/2011 | Nemoto et al. |
| 2011/0218313 A1 | 9/2011 | Mase et al. |
| 2012/0129094 A1 | 5/2012 | Yamauchi et al. |
| 2014/0296448 A1 | 10/2014 | Nemoto et al. |
| 2014/0350209 A1 | 11/2014 | Nemoto et al. |

FOREIGN PATENT DOCUMENTS

| | | |
|---|---|---|
| EP | 2 808 357 A1 | 12/2014 |
| JP | 10-504602 | 5/1998 |
| JP | 2000-007789 | 1/2000 |
| JP | 2004-277698 | 10/2004 |
| JP | 2004-302323 | 10/2004 |
| JP | 4113452 | 4/2008 |
| JP | 2011-208115 | 10/2011 |
| JP | 2011-208116 | 10/2011 |
| JP | 2012-108334 | 6/2012 |
| JP | 2012-110888 | 6/2012 |
| JP | 2012-172074 | 9/2012 |
| JP | 2013-189616 | 9/2013 |
| JP | 2013-198880 | 10/2013 |
| JP | 2013-216851 | 10/2013 |
| KR | 10-2004-0031970 | 4/2004 |
| WO | WO96/06118 A1 | 2/1996 |
| WO | WO2013/018873 A1 | 2/2013 |
| WO | WO2013/018874 A1 | 2/2013 |
| WO | WO2013/024834 A1 | 2/2013 |
| WO | WO2013/146558 A1 | 10/2013 |

OTHER PUBLICATIONS

Blakey, I. et al., "Controlled polymerisation of lactide using an organo-catalyst in supercritical carbon dioxide", Green Chem., 2011, 6 pages.

H. S. Ganapathy et al., "Ring-opening polymerization of L-lactide in supercritical carbon dioxide using PDMS based stabilizers", European Polymer Journal, vol. 43, 2007, pp. 119-126.

Extended Search Report issued Oct. 23, 2015 in European Patent Application No. 13846042.3.

Office Action issued Mar. 2, 2016, in corresponding Chinese patent Application No. 201380053014.3 (with English-language Translation).

Korean Office Action issued Feb. 22, 2016, in corresponding Korean Patent Application No. 10-2015-7011045 (with English-language Translation).

PARTICLE MANUFACTURING METHOD, PARTICLES, AND PARTICLE MANUFACTURING APPARATUS

TECHNICAL FIELD

The present invention relates to a method for manufacturing particles containing a polymer, particles manufactured by the same manufacturing method, and a particle manufacturing apparatus.

BACKGROUND ART

It has conventionally been known to granulate a polymer into particles and use the obtained particles as materials for, for example, pharmaceutical products and cosmetic products, or as products such as electrophotographic toners.

In a known method for granulating a polymer, a polymer is emulsified with an organic solvent (see PTL 1). According to this method, lactide, which is a ring-opening-polymerizable monomer, is ring-opening-polymerized to a polymer, which is then dissolved in methylene chloride serving as an organic solvent, neutralized with triethylamine, and after this, emulsified by phase-inversion emulsification with distilled water added dropwise and mixed therein. However, according to this method, methylene chloride remains in the particles. Therefore, the particles cannot be used for purposes in which any residual of the organic solvent is unwanted.

A known method for granulating a polymer without an organic solvent uses a compressible fluid (see PTL 2). According to this method, polyester is heated, melted, and then mixed with liquefied carbon dioxide prepared as a compressible fluid, and the resulting mixture is jetted from a nozzle so as to be granulated by depressurized expansion. In this case, if polymer components with high viscosities are locally present in the mixture, the nozzle might be clogged with them. Therefore, in the disclosed method, the polyester and the compressible fluid are mixed with a static mixer before jetting.

CITATION LIST

Patent Literature

[PTL 1] Japanese Patent Application Laid-Open (JP-A) No. 2000-7789
[PTL 2] JP-A No. 2004-302323

SUMMARY OF INVENTION

Technical Problem

However, when the molecular weight of the polymer is high or when the polymer has crystallinity, the polymer has poor affinity with the compressible fluid, and cannot mix well with the compressible fluid. This makes it necessary to mix the polymer with the compressible fluid after heating the polymer to a high temperature to reduce its viscosity. This raises a problem that the resulting particles have degraded physical properties as a polymer, due to the influences of the heat.

Solution to Problem

An invention disclosed is a particle manufacturing method, including: ring-opening-polymerizing a ring-opening-polymerizable monomer after bringing the ring-opening-polymerizable monomer into contact with a first compressible fluid; and granulating a polymer obtained in the ring-opening-polymerizing by jetting the polymer and the first compressible fluid.

Advantageous Effects of Invention

The particle manufacturing method according to the present invention includes ring-opening-polymerizing a ring-opening-polymerizable monomer after bringing the ring-opening-polymerizable monomer into contact with a compressible fluid. Through this step, a polymer is obtained in a state mixed with the compressible fluid. In this case, it is possible to reduce the amount of heat to be applied to the polymer from the amount thereof in the case of mixing the polymer with the compressible fluid after heating it to a high temperature to reduce its viscosity. This realizes an effect that it is possible to prevent degradation of the physical properties of the obtained particles as a polymer.

DESCRIPTION OF EMBODIMENTS

First Embodiment

Figure 1:
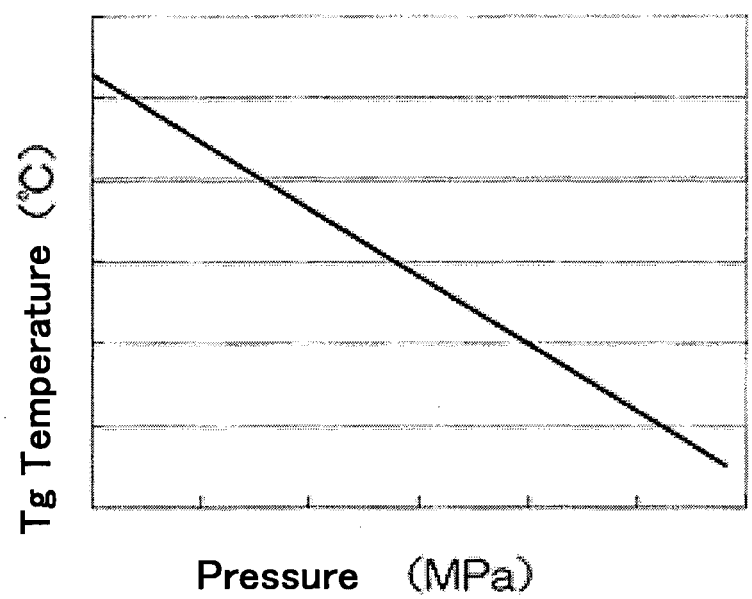
FIG. 1 is a diagram showing a relationship between glass transition temperature of a pressure-plastic material and pressure.

An embodiment of the present invention will be explained below. A particle manufacturing method according to the present embodiment includes: ring-opening polymerizing a ring-opening-polymerizable monomer after bringing the ring-opening-polymerizable monomer into contact with a first compressible fluid; and granulating a polymer obtained in the ring-opening-polymerizing by jetting the polymer and the first compressible fluid.

<<Raw Materials>>

First, the components such as the ring-opening-polymerizable monomer used as raw materials in the manufacturing method described above will be explained. In the present embodiment, raw materials include materials from which a polymer is produced, and which become the constituent components of the polymer. Raw materials include at least a ring-opening-polymerizable monomer, and optional components such as an initiator and additives to be appropriately selected according to the needs.

<Ring-Opening-Polymerizable Monomer>

Although depending on the compressible fluid to be used in combination, a preferable example of the ring-opening-polymerizable monomer used in the present embodiment is one that contains a carbonyl skeleton such as an ester bond in the ring. A carbonyl skeleton is highly reactive, because it is constituted by a π-bond between highly electronegative oxygen and carbon, and the oxygen attracts π-bond electrons to thereby have itself polarize to the negative side and carbon to the positive side. When the compressible fluid is carbon dioxide, it is estimated that the level of affinity between carbon dioxide and the polymer to be obtained will be high, because a carbonyl skeleton is similar to the structure of carbon dioxide. Assisted by these effects, the level of plasticization by the compressible fluid to the polymer to be obtained will be high. Examples of such ring-opening-polymerizable monomers include cyclic ester and cyclic carbonate.

Preferable examples of the cyclic ester include but are not limited to cyclic dimers obtained by dehydration-condensing an L-form or a D-form of a compound represented by General Formula (1) below.

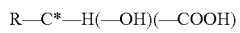 General Formula (1)

(In General Formula (1), R represents an alkyl group containing 1 to 10 carbon atoms. Further, in General Formula (1), C* represents asymmetric carbon.)

Specific examples of the compound represented by General Formula (1) above include enantiomers of lactic acid, enantiomers of 2-hydroxybutanoic acid, enantiomers of 2-hydroxypentanoic acid, enantiomers of 2-hydroxyhexanoic acid, enantiomers of 2-hydroxyheptanoic acid, enantiomers of 2-hydroxyoctanoic acid, enantiomers of 2-hydroxynonanoic acid, enantiomers of 2-hydroxydecanoic acid, enantiomers of 2-hydroxyundecanoic acid, and enantiomers of 2-hydroxydodecanoic acid. Among them, enantiomers of lactic acid are preferable since they are highly reactive and readily available. Cyclic dimers obtained by dehydration-condensing them may be used alone, or two or more of such cyclic dimers may be used as a mixture.

Examples of the cyclic ester other than cyclic dimers obtained by dehydration-condensing an L-form or a D-form of a compound represented by General Formula (1) include aliphatic lactone, such as β-propiolactone, β-butyrolactone, γ-butyrolactone, γ-hexanolactone, γ-octanolactone, δ-valerolactone, δ-hexanolactone, δ-octanolactone, ε-caprolactone, δ-dodecanolactone, α-methyl-γ-butyrolactone, β-methyl-δ-valerolactone, glycolide and lactide. Among them, ε-caprolactone is particularly preferable since it is highly reactive and readily available.

Examples of the cyclic carbonate include but are not limited to ethylene carbonate and propylene carbonate. These ring-opening-polymerizable monomers may be used independently, or in combination.

It is preferable that the above-described ring-opening-polymerizable monomer of the present embodiment be polymerized to a polymer that is a pressure-plastic material. In the present embodiment, a pressure-plastic material mentioned above is a material, of which glass transition temperature (Tg) lowers by application of pressure, to be more specific, a material that is plasticized by application of pressure, without application of heat. A pressure-plastic material will now be explained with reference to FIG. 1. FIG. 1 is a diagram showing a relationship between the glass transition temperature of a pressure-plastic material and pressure. When pressure is applied to the pressure-plastic material upon, for example, a contact with a compressible fluid, the pressure-plastic material plasticizes at a temperature lower than its glass transition temperature at the atmospheric pressure.

<Catalyst>

A catalyst used in the present embodiment can be appropriately selected according to the purpose, and may be a metal catalyst containing a metal atom, or may be an organic catalyst free from a metal atom.

The metal catalyst is not particularly limited, and examples include conventional catalysts: such as a tin compound such as tin octylate, tin dibutylate, and tin di(2-ethylhexanoate); an aluminum compound such as aluminum acetylacetonate and aluminum acetate; a titanium compound such as tetraisopropyl titanate and tetrabutyl titanate a zirconium compound such as zirconium isopropoxide; and an antimony compound such as antimony trioxide.

For purposes in which safety and stability of the product to be obtained is required, preferable as the catalyst used in the present embodiment is an organic compound (organic catalyst) free from a metal atom. The organic catalyst may be anything as long as it contributes to the ring-opening-polymerization reaction of the ring-opening-polymerizable monomer, and after forming an active intermediate product with the ring-opening-polymerizable monomer, desorbs and regenerates by reacting with an alcohol.

As the organic catalyst, preferable is a compound having basicity and serving as a nucleophilic agent, more preferable is a basic nucleophilic nitrogen-containing compound, and even more preferable is a nitrogen-containing cyclic compound. Such a compound is not particularly limited, and examples thereof include cyclic monoamine, cyclic diamine (a cyclic diamine compound having an amidine skeleton), a cyclic triamine compound having a guanidine skeleton, a heterocyclic aromatic organic compound containing a nitrogen atom, and N-heterocyclic carbine. Note that, a cationic organic catalyst is used for the ring-opening-polymerization reaction, but the cationic organic catalyst takes hydrogen off (back-biting) from a principle chain of a polymer and therefore a molecular weight distribution of a resulting polymer product becomes wide and it is difficult to obtain the polymer product having high molecular weight.

Examples of the cyclic monoamine include quinuclidine. Examples of the cyclic diamine include 1,4-diazabicyclo[2.2.2]octane (DABCO) and 1,5-diazabicyclo(4,3,0)-5-nonene. Examples of the cyclic diamine compound having an amidine skeleton include 1,8-diazabicyclo[5.4.0]undec-7-ene (DBU) and diazabicyclononene. Examples of the cyclic triamine compound having a guanidine skeleton include 1,5,7-triazabicyclo[4.4.0]dec-5-ene (TBD) and diphenylguanidine (DPG).

Examples of the heterocyclic aromatic organic compound containing a nitrogen atom include N,N-dimethyl-4-aminopyridine (DMAP), 4-pyrrolidinopyridine (PPY), pyrrocolin, imidazole, pyrimidine and purine. Examples of the N-heterocyclic carbene include 1,3-di-tert-butylimidazol-2-ylidene (ITBU). Among them, DABCO, DBU, DPG, TBD, DMAP, PPY, and ITBU are preferable, as they have high nucleophilicity without being greatly affected by steric hindrance, or they have such boiling points that they can removed under the reduced pressure.

Among these organic catalysts, for example, DBU is liquid at room temperature, and has a boiling point. In the case where such organic catalyst is selected for use, the organic catalyst can be removed substantially quantitatively from the obtained polymer by treating the polymer under the reduced pressure. Note that, the type of the organic catalyst, or whether or not a removal treatment is performed, is determined depending on an intended use of a generated polymer product.

The type and amount of the organic catalyst cannot be determined unconditionally as they vary depending on a combination of the compressible fluid to be described later and the ring-opening-polymerizable monomer, but the amount thereof is preferably from 0.01 mol % to 15 mol %, more preferably from 0.1 mol % to 1 mol %, and even more preferably from 0.3 mol % to 0.5 mol %, relative to 100 mol % of the ring-opening-polymerizable monomer. When the amount thereof is smaller than 0.01 mol %, the organic catalyst is deactivated before completion of the polymerization reaction, and as a result a polymer having a target molecular weight cannot be obtained in some cases. When the amount thereof is greater than 15 mol %, it may be difficult to control the polymerization reaction.

<Optional Substances>

In the manufacturing method of the present embodiment, other than the aforementioned ring-opening-polymerizable monomer, a ring-opening-polymerization initiator (initiator) and other additives can be used as optional substances of the raw materials.

(Initiator)

In the present embodiment, an initiator is suitably used for controlling a molecular weight of a polymer as obtained. As for the initiator, a conventional initiator can be used. As long as the initiator s alcohol-based, it may be, for example, aliphatic mono or di alcohol, or polyhydric alcohol, and may be either saturated or unsaturated. Specific examples of the initiator include: monoalcohol such as methanol, ethanol, propanol, butanol, pentanol, hexanol, heptanol, nonanol, decanol, lauryl alcohol, myristyl alcohol, cetyl alcohol, and stearyl alcohol; dialcohol such as ethylene glycol, 1,2-propanediol, 1,3-propanediol, 1,3-butanediol, 1,4-butanediol, hexanediol, nonanediol, tetramethylene glycol, and polyethylene glycol; polyhydric alcohol such as glycerol, sorbitol, xylitol, ribitol, erythritol, and triethanol amine; and others such as methyl lactate, and ethyl lactate.

Moreover, a polymer having an alcohol residue at a terminal thereof, such as polycaprolactonediol and polytetramethylene glycol, may be used as the initiator. A use of such polymer enables to synthesize diblock copolymers or triblock copolymers.

An amount of the initiator may be appropriately adjusted depending on the intended molecular weight of a resulting polymer, but it is preferably from 0.05 mol % to 5 mol %, relative to 100 mol % of the ring-opening-polymerizable monomer. In order to prevent a reaction from being initiated unevenly, the initiator is preferably sufficiently mixed with the monomer before the monomer is brought into contact with a polymerization catalyst.

(Additive)

Moreover, an additive may be added for the ring-opening-polymerization, if necessary. Examples of the additive include a surfactant, an antioxidant, a stabilizer, an anticlouding agent, a UV ray-absorber, a pigment, a colorant, inorganic particles, various fillers, a thermal stabilizer, a flame retardant, a crystal nucleating agent, an antistatic agent, a surface wet improving agent, an incineration adjuvant, a lubricant, a natural product, a releasing agent, a plasticizer, and other similar components. If necessary, a polymerization terminator (e.g., benzoic acid, hydrochloric acid, phosphoric acid, metaphosphoric acid, acetic acid and lactic acid) may be used after completion of polymerization reaction. An amount of the additives varies depending on intended purpose for adding the additive, or a type of the additives, but it is preferably from 0 parts by mass to 5 parts by mass, relative to 100 parts by mass of the polymer composition.

The surfactant for use is preferably a surfactant which is dissolved in the compressible fluid, and has compatibility to both the compressible fluid and the ring-opening-polymerizable monomer. Use of such surfactant can give effects that the polymerization reaction can be uniformly promoted, and the resultant polymer has a narrow molecular weight distribution and be easily produced as particles. When the surfactant is used, the surfactant may be added to the compressible fluid, or may be added to the ring-opening-polymerizable monomer. In the case where carbon dioxide is used as the compressible fluid, for example, a surfactant having groups having affinity with carbon dioxide and groups having affinity with the monomer can be used. Examples of such surfactant include a fluorosurfactant, and a silicone surfactant.

As for the stabilizer, used are epoxidized soybean oil, and carbodiimide. As for the antioxidant, 2,6-di-t-butyl-4-methyl phenol, and butylhydroxyanisol are used. As for the anticlouding agent, glycerin fatty acid ester, and monostearyl citrate are used. As for the filler, a UV ray-absorber, a thermal stabilizer, a flame retardant, an internal mold release agent, and additives having an effect of a crystal nucleus agent (e.g., clay, talc, and silica) are used. As for the pigment, titanium oxide, carbon black, and ultramarine blue are used.

<<Compressible Fluid>>

Figure 2:
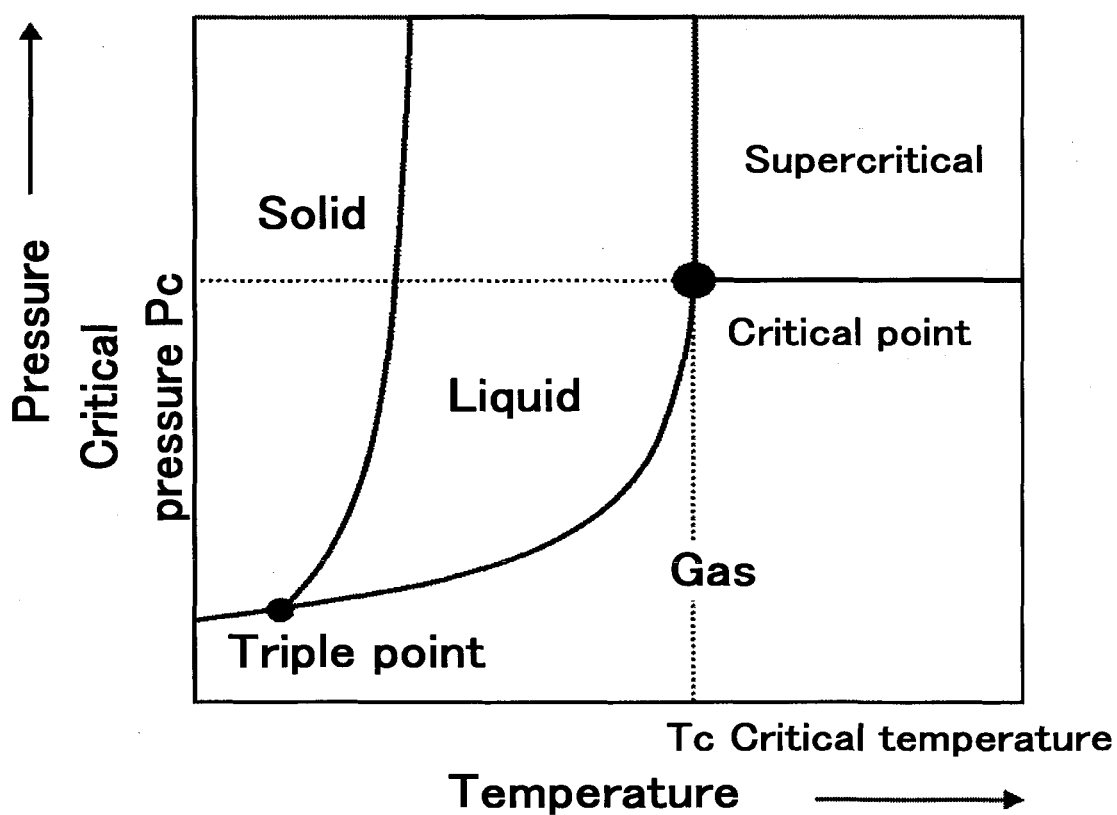
FIG. 2 is a phase diagram showing the state of a substance relative to temperature and pressure.
Figure 3:
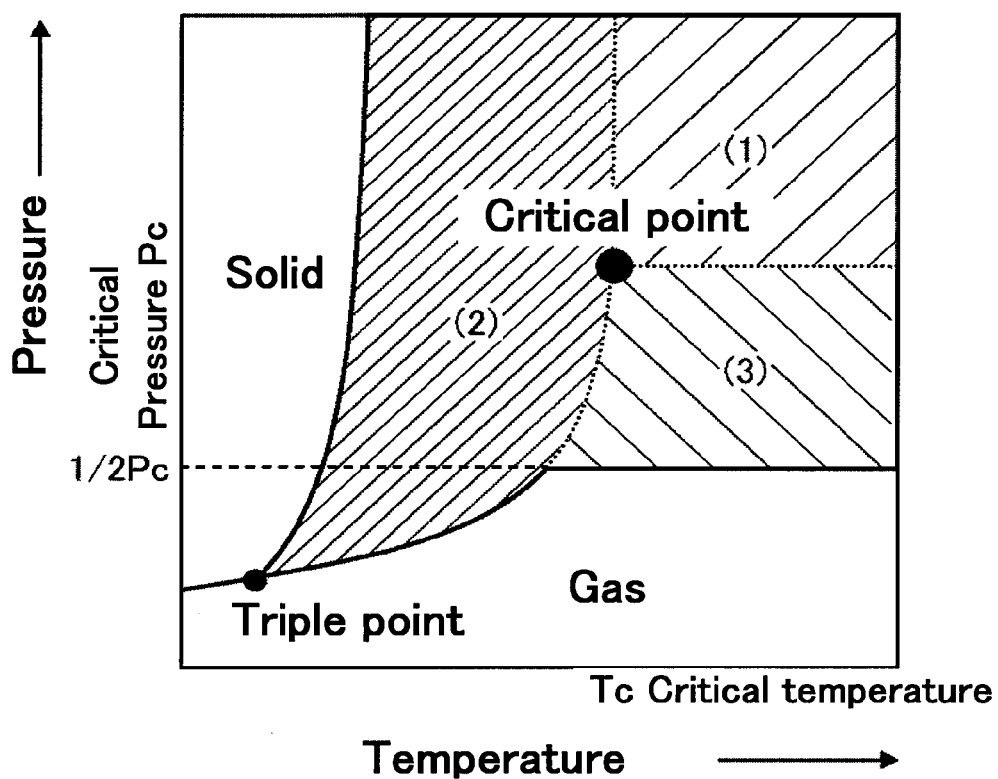
FIG. 3 is a phase diagram for defining the range of compressible fluids in an embodiment.

Next, the compressible fluid used in the manufacturing method of the present embodiment will be explained with reference to FIG. 2 and FIG. 3. FIG. 2 is a phase diagram depicting the state of a substance depending on temperature and pressure conditions. FIG. 3 is a phase diagram which defines the range of the compressible fluid in the present embodiment. The compressible fluid has characteristics such as rapid mass transferability, rapid heat transferability, and a low viscosity, and at the same time, has characteristics that its density, dielectric constant, solubility parameter, and free volume change continuously and greatly in accordance with changes in temperature and pressure. Because the surface tension of the compressible fluid is much smaller than that of an organic solvent, the compressible fluid conforms even to minute undulations (surface) and can wet such undulations. Further, by being returned to normal pressure, the compressible fluid can be easily separated from the product obtained, and can be collected and recycled. Therefore, the manufacturing method of the present embodiment produces less environmental impacts during the manufacturing process than the methods using water and an organic solvent.

In the present embodiment, the term "compressible fluid" refers to a state of a fluid present in any one of the regions (1), (2) and (3) of FIG. 3 in the phase diagram of FIG. 2. In such regions, the substance is known to have extremely high density and show different behaviors from those shown at normal temperature and normal pressure. Note that, a substance is a supercritical fluid when it is present in the region (1). The supercritical fluid is a fluid that exists as a noncondensable high-density fluid at temperature and pressure exceeding a critical point, which is the limit at which a gas and a liquid can coexist, and that does not condense even when it is compressed. When a substance is in the region (2), the substance is a liquid, but in the present embodiment, it is a liquefied gas obtained by compressing a substance existing as a gas at normal temperature (25° C.) and ambient pressure (1 atm). When a substance is in the region (3), the substance is in the state of a gas, but in the present embodiment, it is a high-pressure gas whose pressure is ½ or higher than the critical pressure (Pc), i.e. ½Pc or higher.

Examples of a substance that can be used as the compressible fluid include carbon monoxide, carbon dioxide, dinitrogen oxide, nitrogen, air, oxygen, argon, helium, neon, krypton, methane, ethane, propane, 2,3-dimethylbutane, ethylene, ammonia, normal butane, isobutene, normal pentane, and chlorotrifluoromethane. Two or more of these substances may be used in a mixture as the compressible fluid.

In the manufacturing method of the present embodiment, the compressible fluid to be used in the polymerization (hereinafter also referred to as a first compressible fluid) is not particularly limited, but a preferable example thereof is carbon dioxide because carbon dioxide can easily become a supercritical state, is non-combustible and safe, and can realize a toner having a hydrophobic surface when used in toner production.

In the present embodiment, a second compressible fluid may be used in the granulation, independently from the first compressible fluid. The second compressible fluid is supplied for jetting the polymer. The second compressible fluid is not particularly limited, and examples thereof include the substances that can be used as the aforementioned compressible fluid. Preferable examples thereof are, however, substances such as oxygen and nitrogen having a highest inversion temperature of 800 K or lower, of which compressible fluid contains nitrogen. When a substance is said to contain nitrogen here, the substance contains nitrogen molecules, and the air can also be said to contain nitrogen. Nitrogen has a highest inversion temperature of 620 K, which is lower than that of carbon dioxide (with a highest inversion temperature of 1,500 K). Therefore, a temperature drop which nitrogen undergoes based on Joule-Thomson effect when the pressure of nitrogen is reduced is smaller than that of carbon dioxide that occurs when the pressure of carbon dioxide is reduced. As compared with this, a second compressible fluid with an excessively high highest inversion temperature such as carbon dioxide is excessively cooled based on Joule-Thomson effect when a melt is jetted, and the melt might be solidified before it is granulated to particles, resulting in a product in which fiber-like or merged shapes are mixed. Further, excess cooling causes the melt to be solidified in the nozzle from which the melt is jetted, making it impossible to manufacture particles with a small particle size having a narrow particle size distribution over a long time.

In the present embodiment, the compressible fluid can be used together with an entrainer (cosolvent). Examples of the entrainer include: alcohols such as methanol, ethanol, and propanol; ketones such as acetone and methyl ethyl ketone; and organic solvents such as toluene, ethyl acetate, and tetrahydrofuran.

When the particles to be manufactured by the manufacturing method of the present embodiment are of a toner, another fluid can also be used in addition to the compressible fluid. Preferable as the other fluid is one that makes it easier to control the solubility of the toner composition. Specific examples thereof include methane, ethane, propane, butane, and ethylene.

<<<Particle Manufacturing Apparatus>>>

Figure 4:
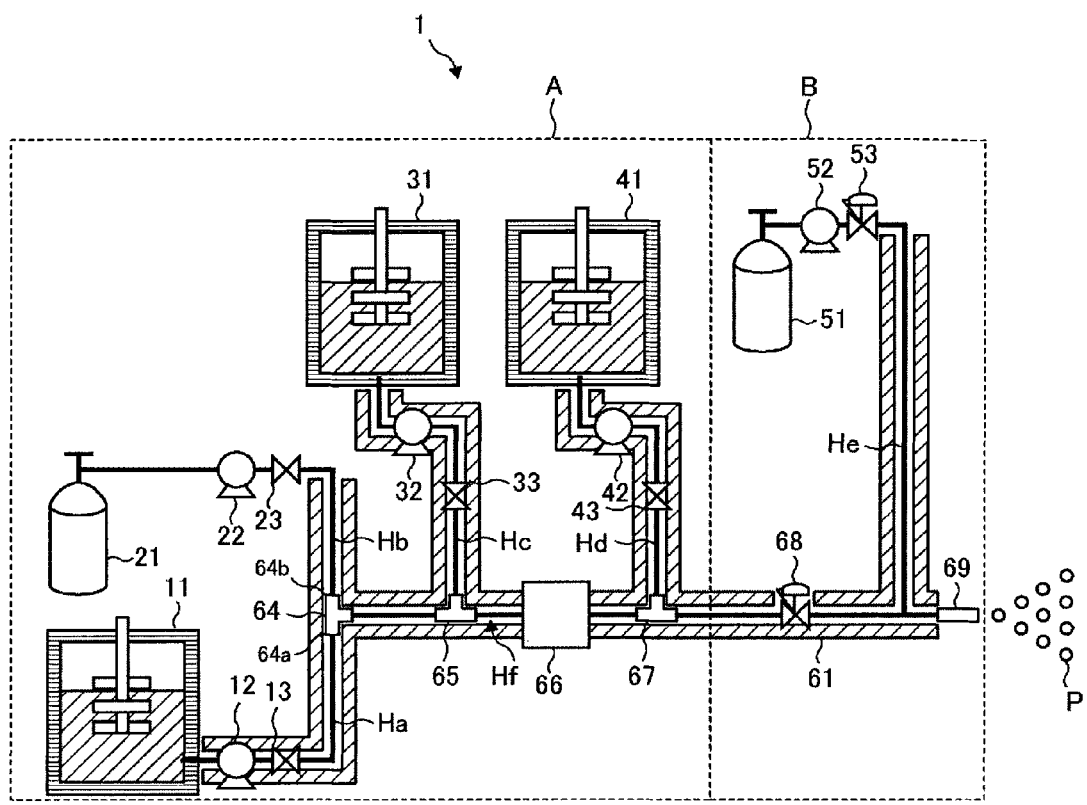
FIG. 4 is an exemplary diagram showing an example of a particle manufacturing apparatus.

Next, a particle manufacturing apparatus used in the particle manufacturing method of the present embodiment will be explained with reference to the drawing. FIG. 4 is an exemplary diagram showing an example of the particle manufacturing apparatus used in the particle manufacturing method of the present embodiment. The particle manufacturing apparatus of the present embodiment includes a monomer inlet for introducing a ring-opening-polymerizable monomer and a compressible fluid inlet for introducing a compressible fluid at one end of a path through which the ring-opening-polymerizable monomer or a polymer polymerized from ring-opening-polymerization of the ring-opening-polymerizable monomer is passed. The particle manufacturing apparatus also includes a nozzle for jetting the polymer at the other end thereof, and a catalyst inlet for introducing a catalyst between the one end and the other end.

The particle manufacturing apparatus 1 includes a temperature-controller-equipped monomer tank 11, a pump 12, and a valve 13, which are connected to each other by a pipe Ha to constitute a first path. The particle manufacturing apparatus 1 also includes a cylinder 21, a pump 22, and a valve 23, which are connected to each other by a pipe Hb to constitute a second path. The particle manufacturing apparatus 1 also includes a temperature-controller-equipped catalyst tank 31, a pump 32, and a valve 33, which are connected to each other by a pipe Hc to constitute a third path. The particle manufacturing apparatus 1 also includes an additive tank 41, a pump 42, and a valve, which are connected to each other by a pipe Hd to constitute a fourth path. The particle manufacturing apparatus 1 also includes a cylinder 51, a pump 52, and a back pressure valve 53, which are connected to each other by a pipe He to constitute a fifth path. The particle manufacturing apparatus 1 also includes a reaction vessel 66, a back pressure valve 68, and a nozzle 69, which are connected to each other by a pipe Hf to constitute a sixth path. The pipe Hf is one example of a path through which a ring-opening-polymerizable monomer or a polymer produced from ring-opening-polymerization of the ring-opening-polymerizable monomer is passed.

The ends of the first path, second path, and sixth path of the particle manufacturing apparatus 1 are mutually connected by a mixer 64. The third path and sixth path of the particle manufacturing apparatus 1 are mutually connected by a mixer 65 as shown in FIG. 4. The fourth path and sixth path of the particle manufacturing apparatus 1 are mutually connected by a mixer 67 as shown in FIG. 4. The fifth path and sixth path of the particle manufacturing apparatus 1 are mutually connected as shown in FIG. 4.

In the present embodiment, an arbitrary one of the pipes Ha, Hb, Hc, Hd, He, and Hf is referred to as "pipe H". The pipe H is not particularly limited as long as it can pass each raw material, compressible fluids, and the obtained polymer, but a preferable example thereof is an ultra-high pressure pipe. The pipe H is temperature-controlled by a heater 61, and each pump, valve, and mixer, and the reaction vessel are also temperature-controlled.

The monomer tank 11 provided on the first path is a device for storing, heating, and melting a ring-opening-polymerizable monomer. The ring-opening-polymerizable monomer to be stored may be solid at room temperature, as long as it is liquefied as heated and melted under the control of the temperature controller provided on the monomer tank 11. The monomer tank 11 may also be equipped with a stirrer, which can accelerate the speed at which the material is melted. The initiator may be added to the monomer tank 11 beforehand. Additives that do not contribute to the reaction may also be added to the monomer tank 11 beforehand. The pump 12 is a device for sending forth the melted ring-opening-polymerizable monomer in the monomer tank 11 by applying pressure. The valve 13 is a device for opening or closing the path between the pump 12 and the mixer 64 to adjust the flow rate or block the flow.

The cylinder 21 provided on the second path is a pressure-tight vessel for storing and supplying a substance (e.g., carbon dioxide) that is turned to a first compressible fluid in the mixer 64. The substance to be stored in the cylinder 21 is preferably air, nitrogen, and carbon dioxide because they are safe, and more preferably carbon dioxide. The substance to be stored in the cylinder 21 may be a gas or a liquid as long as it is turned to a first compressible fluid as heated and pressurized through the path to the mixer 64. The pump 22 is a device for sending forth the substance stored in the cylinder 21 by applying pressure. The valve 23 is a device for opening or closing the path between the pump 22 and the mixer 64 to adjust the flow rate or block the flow.

The mixer 64 includes a monomer inlet 64a for introducing a ring-opening-polymerizable monomer, and a compressible fluid inset 64b for introducing a compressible fluid. Hence, the mixer 64 brings into contact the raw materials such as the ring-opening-polymerizable monomer and the initiator supplied from the first path and the first compressible fluid supplied from the second path, mixes them, and sends them forth to the sixth path. In the present embodiment, the mixer 64 includes a turbulent mixing mechanism in order to mix the first compressible fluid and the raw materials uniformly. Specific examples of such a mixer 64 include a conventional T-junction, a swirl mixer that uses swirl flows actively, a static mixer, and a central collision mixer that makes two liquid flows collide in the mixing area. A biaxial stirrer including a power source may also be used when the viscosity of the melted raw materials supplied from the first path is extremely high.

The mixer 64 brings the raw materials into contact with the compressible fluid to melt or dissolve the raw materials. When raw materials or a produced polymer exist(s) with a compressible fluid, a "melted" state of the raw materials or the produced polymer is a state reached by swelling, plasticizing, and liquefying upon contacting the compressible fluid. A "dissolved" state of the raw materials or the produced polymer is a state reached by dissolving in the compressible fluid. A molten phase is formed when the ring-opening-polymerizable monomer is melted, whereas a dissolved phase is formed when it is dissolved. In order to promote the reaction uniformly, it is preferable that a molten phase and a fluid phase not be formed coexistently, but either a molten phase or a fluid phase be formed alone. Further, in the present embodiment, in order to promote the reaction in a state that the percentage of the raw materials is higher than that of the compressible fluid, it is preferable that the reaction be promoted in a state in which only a molten phase is formed.

The catalyst tank 31 provided on the third path stores a catalyst. The catalyst tank 31 is equipped with a temperature controller, and heats and melts the catalyst when the catalyst is solid. An organic solvent may be added to, or a compressible fluid may be brought into contact with the catalyst in the catalyst tank 31 to liquefy the catalyst. When the catalyst is liquid, a temperature controller is unnecessary. The catalyst tank 31 may be equipped with a stirrer, which can accelerate the speed at which the catalyst is liquefied. The pump 32 is a device for sending forth the liquefied catalyst in the catalyst tank 31 to the sixth path by applying pressure. The mixer 65 is not particularly limited as long as it can mix the raw materials containing the first compressible fluid with the catalyst uniformly, and may be the same one as or a different one from the mixer 64.

The reaction vessel 66 is a pressure-tight vessel for ring-opening-polymerizing the ring-opening-polymerizable monomer. The shape of the reaction vessel may be a tank shape or a cylindrical shape, but a cylindrical shape is preferable because it has less dead space. The reaction vessel 66 may include a gas outlet for evacuating an evaporant. The reaction vessel 66 includes a heater for heating the raw materials supplied. The reaction vessel 66 may also include a stirrer for stirring the raw materials, the first compressible fluid, etc. When the reaction vessel 66 includes a stirrer, the polymerization reaction can be promoted more uniformly and quantitatively, because the stirrer can prevent the polymer particles from settling out due to the density difference between the raw materials and the polymer produced. In terms of self-cleaning ability, preferable as the stirrer of the reaction vessel 66 are mutually engaging screws, stirring elements of 2-flight type (oval) or 3-flight type (triangle), or biaxial or multi-axial stirrers including disk-shaped or multi-leaf-shaped (e.g., clover-shaped) stirring blades. When the raw materials containing the catalyst are mixed well in advance, a static mixer in which a flow is split and combined (merged) through multiple stages by a guiding member can also be used as the stirrer. Examples of such a static mixer include multilayer mixers disclosed in Japanese Patent Application Publication (JP-B) Nos. 47-15526, 47-15527, 47-15528, and 47-15533, a Kenics mixer disclosed in JP-A No. 47-33166, and similar mixers with no moving members. When the reaction vessel 66 does not include a stirrer, a tube reactor, an ultra high pressure pipe, or the like is preferable as the reaction vessel 66.

FIG. 4 shows an example in which one reaction vessel is provided. However, two or more reaction vessels may be used. When a plurality of reaction vessels are used, reaction (polymerization) conditions such as temperature, catalyst concentration, pressure, average dwell time, and stirring speed may be the same in the plurality of vessels, but more preferably, should be optimized in each vessel in accordance with the degree of polymerization. It is inadvisable to join too many vessels in a multistage fashion because this would increase the reaction time or complicate the apparatus. The number of stages is preferably from 1 to 4, particularly preferably from 1 to 3. Use of only one reaction vessel for polymerization is generally considered unsuitable for industrial manufacture, because the polymerization degree and the remaining monomer amount of the polymers to be obtained are unstable and subject to fluctuation. The reason for this is considered to be instability due to the coexistence of polymerization raw materials having a melt viscosity of from about several poise to about several ten poise and polymerized polymer having a melt viscosity of about 1,000 poise in the same vessel. As compared with this, according to the present embodiment, it is possible to reduce the viscosity difference in the reaction vessel 66 (also referred to as a polymerization system) by melting (liquefying) the raw materials and produced polymer. Therefore, it is possible to manufacture a polymer stably even with a smaller number of stages than in a conventional polymerization reaction apparatus.

The additive tank 41 provided on the fourth path is equipped with a temperature controller, and heats and melts the additives. The additive tank 41 may also be equipped with a stirrer, which can accelerate the speed at which the additives are melted. The pump 42 is a device for sending forth the melted additives in the additive tank 41 to the sixth path by applying pressure. The fourth path needs not be used when additives are unnecessary.

The mixer 67 is not particularly limited as long as it can mix the polymer produced in the reaction vessel 66 with the additives uniformly, and may be the same one as or a different one from the mixer 64 or 65.

The cylinder 51 is a pressure-tight vessel for storing and supplying a substance that is turned to a second compressible fluid through the fifth path. The substance to be stored in the cylinder 51 is preferably air, nitrogen, argon, helium, and carbon dioxide in terms of safety, more preferably air, nitrogen, and carbon dioxide in terms of also costs, etc. The substance to be stored in the cylinder 51 may be a gas or a liquid as long as it can be turned to the second compressible fluid as heated and pressurized through the fifth path.

The pump 52 is a device for sending forth the second compressible fluid stored in the cylinder 51 to the sixth path. The back pressure valve 53 is a device that opens or closes between the pump 52 and the sixth path to adjust the flow rate of the second compressible fluid or block the flow. A pressure accumulator may be provided between the pump 52 and the back pressure valve 53, if necessary. The compressible fluid heated by the heater 61 will be cooled at the outlet of the nozzle 69 by Joule-Thomson effect. Therefore, it is preferable that the compressible fluid be sufficiently heated until it becomes the supercritical fluid state of (1) in the phase diagram of FIG. 3.

The back pressure valve 68 is a device that opens or closes the path between the mixer 67 and the nozzle 69 to adjust the flow rate and pressure of the melted product obtained by the mixer 67.

The nozzle 69 of the particle manufacturing apparatus 1 is a device for jetting the melted product containing the first compressible fluid 1 by supplying thereto the second compressible fluid supplied from the fifth path. With the second compressible fluid supplied, the melted product jetted from the nozzle 69 can be prevented from pressure loss. This would improve the workability, and make it possible to manufacture particles even when the resin has a high molecular weight.

The nozzle 69 is not particularly limited to any type, but a direct fire nozzle is preferable. The diameter of the nozzle 69 is not particularly limited as long as the nozzle can keep a constant jetting pressure. However, an excessively large diameter makes the jetting pressure so small that the viscosity of the melted product might increase to make it difficult to obtain fine particles. Further, an excessively large diameter will necessitate upsizing of the pump 52, etc. in order to keep the pressure in the nozzle 69. Meanwhile, an excessively small diameter makes it more likely for the nozzle 69 to be clogged with the melted product, which might make it difficult to obtain intended fine particles. Therefore, the nozzle diameter does not have an upper limit, but has a lower limit of preferably 5 μm or greater, more preferably 20 μm or greater, and particularly preferably 50 μm or greater.

<<Process and Operation>>

Next, the process and operation for manufacturing a toner as an example of particles, with the particle manufacturing apparatus 1 of FIG. 4 will be explained. The particle manufacturing method of the present embodiment includes: ring-opening-polymerizing a ring-opening-polymerizable monomer after bringing the ring-opening-polymerizable monomer into contact with a first compressible fluid; and granulating a polymer obtained from the polymerization by jetting the polymer and the first compressible fluid.

<Polymerizing Step>

First, the pump 12 and the pump 22 are actuated and the valve 13 and the value 23 are opened to bring the ring-opening-polymerizable monomer and the first compressible fluid into contact with each other, mix them, and melt the ring-opening-polymerizable monomer in the presence of the first compressible fluid in the mixer 64, to thereby obtain a melted product Y1. Next, the pump 32 is actuated and the valve 33 is opened to mix the melted product Y1 with the catalyst in the mixer 65, to thereby obtain a melted product Y2. In the present embodiment, the catalyst is added after the raw materials are melted in the presence of the first compressible fluid. In conventional methods for ring-opening-polymerizing a ring-opening-polymerizable monomer with a compressible fluid, no consideration has been given about the timing to add the catalyst. In the present embodiment, in the ring-opening-polymerization, the catalyst will be added after the first compressible fluid and the raw materials such as the ring-opening-polymerizable monomer and initiator are mixed well in the mixer 64 and the melted product Y1 is obtained, because the catalyst has a high activity. If the catalyst is added before the melted product Y1 is sufficiently melted, the reaction might progress unevenly. When the ring-opening-polymerizable monomer, the catalyst, etc. are solid at room temperature, they are melted in the monomer tank 11 and the catalyst tank 31 by means of heating, etc. Methods other than heating include a method of adding an organic solvent to the catalyst, a method of bringing the catalyst into contact with a compressible fluid, etc. When the mixer 64 and the mixer 65 include a stirrer, the raw materials and the first compressible fluid may be stirred.

The feeding speeds of the pump 12 and pump 32 are adjusted such that the ring-opening-polymerizable monomer and the catalyst are fed at a constant ratio based on their intended quantitative ratio. The raw material feed amount (parts by mass/min), which is the total mass of the ring-opening-polymerizable monomer and the catalyst fed per a unit time by the pump 12 and the pump 32, is adjusted based on physical properties desired of the polymer, reaction time, etc. Likewise, the feed amount (parts by mass/min) of the first compressible fluid fed by the pump 22 is adjusted based on physical properties desired of the polymer, reaction time, etc.

The feeding amount ratio between the raw materials and the first compressible fluid (the feeding amount of the raw materials/the feeding amount of the first compressible fluid: feeding ratio) is preferably 1 or greater, more preferably 3 or greater, still more preferably 5 or greater, and particularly preferably 10 or greater. The upper limit of the feeding ratio is preferably 1,000 or lower, more preferably 100 or lower, and particularly preferably 50 or lower.

If the feeding ratio is 1 or greater, the reaction will progress in the reaction vessel 66 with the raw materials and produced polymer present at a high concentration (with a high so-called solid content concentration). This solid content concentration in the polymerization system is largely different from a solid content concentration in the polymerization system obtained by a conventional manufacturing method in which a small amount of a ring-opening-polymerizable monomer is dissolved in an overwhelmingly large amount of a compressible fluid to be polymerized. The characteristic of the manufacturing method of the present embodiment is that the polymerization reaction will progress efficiently and stably even in a polymerization system with a high solid content concentration. In the present embodiment, the feeding ratio may be set to less than 1. Also in this case, the polymer to be obtained is non-problematic in the quality, but the economical efficiency will degrade. If the feeding ratio is greater than 1,000, the capacity of the compressible fluid to melt the ring-opening-polymerizable monomer might be short, and the intended reaction might not progress uniformly.

The melted product Y2 obtained in the mixer 65 is stirred well by the stirrer of the reaction vessel 66 if necessary, and is heated by the heater to a predetermined temperature. As a result, the ring-opening-polymerizable monomer is ring-opening-polymerized in the reaction vessel 66 in the presence of the catalyst.

The temperature for ring-opening-polymerizing the ring-opening-polymerizable monomer (polymerization reaction temperature) is not particularly limited, but is 40° C. or higher, preferably 50° C. or higher, and more preferably 60° C. or higher. If the polymerization reaction temperature is lower than 40° C., some kinds of ring-opening-polymerizable monomer might take a long time to be dissolved in the compressible fluid, or result in an insufficiently melted state, or spoil the activity of the catalyst. This would slow down the reaction speed of polymerization and disturb a quantitative polymerization reaction.

The upper limit of the polymerization reaction temperature is not particularly limited, but is the higher one of 170° C. and a temperature higher by 30° C. than the melting point of the ring-opening-polymerizable monomer. The upper limit of the polymerization reaction temperature is preferably the higher one of 150° C. and the melting point of the ring-opening-polymerizable monomer. A more preferable upper limit of the polymerization reaction temperature is the higher one of 130° C. and a temperature lower by 20° C. than the melting point of the ring-opening-polymerizable monomer. If the polymerization reaction temperature is higher than the temperature higher by 30° C. than the melting point of the ring-opening-polymerizable monomer, it becomes easier for depolymerization or the reverse reaction of the ring-opening-polymerization to occur in parallel, making it harder for a quantitative polymerization reaction to occur. When a ring-opening-polymerizable monomer with a low melting point such as a ring-opening-polymerizable monomer that is liquid at room temperature is used, it is possible to set the polymerization reaction temperature to the temperature higher by 30° C. than the melting point of the ring-opening-polymerizable monomer, in order to enhance the activity of the catalyst. Also in this case, the polymerization reaction temperature is not particularly limited, but can be set to a temperature lower than the melting point of the polymer to be produced, and should preferably be set to 170° C. or lower.

The polymerization reaction temperature is controlled by a heater provided in the reaction vessel 66 or by heating from outside the reaction vessel 66. For measurement of the polymerization reaction temperature, the polymer produced from the polymerization reaction may be used.

In a conventional polymer producing method using supercritical carbon dioxide, a large amount of supercritical carbon dioxide is used for polymerizing a ring-opening-polymerizable monomer, because supercritical carbon dioxide has a low ability to lyse a polymer. According to the polymer producing method of the present embodiment using a compressible fluid, a ring-opening-polymerizable monomer can be ring-opening-polymerized at an unprecedentedly high concentration. In this case, the reaction vessel 66 will internally become a high-pressure state in the presence of the compressible fluid, and the glass transition temperature (Tg) of the produced polymer will lower. Consequently, the viscosity of the produced polymer will decrease, allowing a uniform ring-opening-polymerization reaction to progress even at an increased polymer concentration. Further, according to the present embodiment, if the first compressible fluid and the ring-opening-polymerizable monomer are brought into contact and melted continuously, it becomes less likely for the polymer concentration to be uneven in the reaction system.

In the present embodiment, the polymerization reaction time (average dwell time in the reaction vessel 66) is set according to the target molecular weight, and preferably within 1 hour, more preferably within 45 minutes, and still more preferably within 30 minutes. According to the manufacturing method of the present embodiment, the polymerization reaction time can be set to within 20 minutes. This is an unprecedentedly short time for polymerizing a ring-opening-polymerizable monomer in a compressible fluid.

The pressure for polymerization, i.e., the pressure of the first compressible fluid may be a pressure at which the first compressible fluid becomes a liquefied gas ((2) in the phase diagram of FIG. 3) or a pressure at which the first compressible fluid becomes a high-pressure gas ((3) in the phase diagram of FIG. 3). However, a pressure at which the first compressible fluid becomes a supercritical fluid ((1) in the phase diagram of FIG. 3) is preferable. The first compressible fluid in the supercritical fluid state facilitates melting of the ring-opening-polymerizable monomer and enables the polymerization reaction to progress uniformly and quantitatively. When carbon dioxide is used as the first compressible fluid, the pressure thereof is 3.7 MPa or higher, preferably 5 MPa or higher, and more preferably the critical pressure of 7.4 MPa or higher, in terms of the efficiency of the reaction, the ratio of conversion to the polymer, etc. When carbon dioxide is used as the compressible fluid, the temperature thereof is preferably 25° C. or higher for the same reasons.

The amount of water in the reaction vessel 66 is preferably 4 mol % or less, more preferably 1 mol % or less, and still more preferably 0.5 mol % or less relative to 100 mol % of the ring-opening-polymerizable monomer. If the amount of water exceeds 4 mol %, it might be difficult to control the molecular weight, because water also contributes as an initiator. In order to control the amount of water in the polymerization reaction system, it is possible to perform a pre-process of removing water contained in the ring-opening-polymerizable monomer and the other raw materials, if necessary.

In the reaction vessel 66, the monomer in a melted state reacts, resulting in a polymer in a melted state. In this case, the viscosity of a melted product Y3 containing the polymer and the first compressible fluid is not particularly limited as long as it is a viscosity allowing the melt to be jetted from the nozzle 69. However, the lower the viscosity, the smaller the nozzle diameter can be without becoming unable to jet out the melt, making it easier to manufacture fine particles.

Additives can be added to the polymer produced in the reaction vessel 66, if necessary. When the additives contribute to the reaction, the pump 42 is actuated and the valve 43 is opened to mix the polymer produced in the reaction vessel 66 with the additives in the mixer 67. When the additives do not contribute to the reaction, the additives may be previously added to the monomer tank 11 together with the ring-opening-polymerizable monomer. When the additives are solid at normal temperature, the temperature controller of the additive tank 41 may be operated to melt the additives by heating, etc. Methods other than heating include a method of adding an organic solvent and a method of bringing the additives into contact with a compressible fluid. When the mixer 67 includes a stirrer, the polymer produced in the reaction vessel 66 and the additives may be stirred.

<Granulating Step>

Next, the granulating step of the particle manufacturing method of the present embodiment will be explained. This granulating step is a step of jetting the melted polymer product Y3 obtained in the polymerizing step by supplying a second compressible fluid to the melted product Y3 to granulate it into particles.

Here, an example in which the particle manufacturing apparatus 1 shown in FIG. 4 is used will be explained. The cylinder 51 stores nitrogen as an example of a substance that is turned to the second compressible fluid through the fifth path. The pump 52 applies pressure to nitrogen stored in the cylinder 51, and supplies nitrogen to the sixth path through the back pressure valve 53. A pressure accumulator may be provided between the pump 52 and the back pressure valve 53, if necessary. The pressure applied by the pump 52 or the pressure accumulator is not particularly limited and can be appropriately selected according to the purpose. However, it is preferably 1 MPa or higher, more preferably from 10 MPa to 200 MPa, and particularly preferably from 31 MPa to 100 MPa. If the pressure applied to the compressible fluid is lower than 1 MPa, the polymer can be fluidized, but might not be plasticized enough to be granulated. It does not matter how high the pressure is, but a higher pressure requires a more robust apparatus, increasing the facility cost.

Nitrogen supplied by the pump 52 is heated by the heater 61 to be turned to a compressible fluid. The temperature to be set to the heater 61 is not particularly limited, as long as it is a temperature that can turn the supplied substance to a compressible fluid.

Next, the back pressure valve 68 is opened to supply the melted product Y3 containing the produced polymer and the first compressible fluid from the reaction vessel 66 to the nozzle 69. As a result, the melted product Y3 supplied from the reaction vessel 66 is continuously brought into contact with the second compressible fluid supplied from the cylinder 51, and continuously jetted from the nozzle 69 to atmospheric pressure due to pressure difference. In this way, the melted product Y3 can be jetted from the nozzle 69, with the second compressible fluid supplied.

In this case, because the second compressible fluid is supplied, the solid content concentration of the melted product to be jetted lowers, contributing to further lowering of the viscosity of the melted product Y3. As a result, not only is the melted product Y3 to be jetted controlled to a constant temperature, but also the jetting speed (linear velocity at the outlet) is increased, and the shear force to the melted product Y3 is also increased along with the increase of the linear velocity at the outlet). Further, the use of nitrogen as the second compressible fluid alleviates the degree of Joule-Thomson effect temperature drop that accompanies pressure change at the nozzle 69, making it less likely for the nozzle 69 to be clogged. The melted product Y3 jetted from the nozzle 69 solidifies after it becomes particles P. In this case, the synergetic effect of lowering of the melted product viscosity and lowering of the solid content concentration enables uniform fine particles with no merging to be manufactured for a long time. There is also an effect that the particles P to be manufactured are stabilized to a uniform shape.

According to the manufacturing method of the present embodiment, the ring-opening-polymerizable monomer is ring-opening-polymerized while being brought into contact with the compressible fluid, which results in the melted polymer product Y3 being formed at a temperature that is about the melting point of the ring-opening-polymerizable monomer. As compared with this, when in order to granulate a polymer, mixing of the polymer with a compressible fluid is performed after heating and melting of the polymer as in the conventional method, it is necessary to heat the polymer to a temperature equal to or higher than the melting point of the polymer. According to the manufacturing method of the present invention which enables granulation at a low temperature, it is possible to suppress depolymerization of the polymer greatly from the level of depolymerization that occurs in the conventional manufacturing method. This can give the particles P a ratio of the ring-opening-polymerizable monomer having converted to the polymer of 96 mol % or higher, preferably 98 mol % or higher. If the ratio of conversion to the polymer is less than 96 mol %, the particles do not have enough thermal characteristics to qualify as a polymer, and might necessitate a separate operation to remove the ring-opening-polymerizable monomer. In the present embodiment, the ratio of conversion to the polymer means a ratio of the ring-opening-polymerizable monomer contributed to the polymer production to the ring-opening-polymerizable monomer prepared as the raw material. The amount of the ring-opening-polymerizable monomer contributed to the polymer production is obtained by subtracting the amount of the ring-opening-polymerizable monomer remained unreacted (remaining ring-opening-polymerizable monomer) from the amount of the polymer produced.

<<Particles>>

The number-average molecular weight of the polymer obtained in the present embodiment can be adjusted by the amount of the initiator. Although not particularly limited, the number-average molecular weight is typically from 120,000 to 200,000. If the number-average molecular weight is greater than 200,000, the high viscosity might degrade the production efficiency, which is not favorable cost-wise. If the number-average molecular weight is less than 120,000, the particles might not unfavorably have enough strength as a polymer. The quotient of the division of the weight-average molecular weight of the polymer obtained according to the present embodiment by the number-average molecular weight thereof is preferably from 1.0 to 2.5, and more preferably from 1.0 to 2.0. If this value is greater than 2.0, it is probable that the polymerization reaction has progressed non-uniformly, which is unfavorable because the physical properties of the polymer are difficult to control.

When particles are manufactured according to the present embodiment without a metal catalyst, the particles have excellent safeness and stability, because they contain substantially no metal catalyst, no organic solvent, and very little remaining monomer. Therefore, the particles of the present embodiment can be widely used for purposes such as daily products, pharmaceutical products, cosmetic products, electrophotographic toners, etc. In the present embodiment, the metal catalyst means a catalyst that is used for ring-opening-polymerization and that contains a metal. What is meant by containing substantially no metal catalyst is that the content of the metal catalyst in the polymer measured by a conventional analysis method such as ICP emission spectrometry, atomic absorption spectrometry, and colorimetry is equal to or less than the detection limit. In the present embodiment, the organic solvent means a solvent that is made of an organic substance and is used for ring-opening-polymerization, and that can dissolve the polymer produced from the ring-opening-polymerization reaction. What is meant by containing substantially no organic solvent is that the content of the organic solvent in the polymer measured by the measuring method described below is equal to or less than the detection limit.

(Method for Measuring Residual Organic Solvent)

2-propanol (2 parts by mass) is added to the measuring target polymer (1 part by mass) and subjected to ultrasonic wave dispersion for 30 minutes. After this, the resultant is stored in a refrigerator (5° C.) for 1 day or longer, and the organic solvent in the polymer is extracted. The supernatant solution is analyzed by gas chromatography (with GC-14A manufactured by Shimadzu Corporation), and the organic solvent and remaining monomer in the polymer are quantitated, to thereby obtain a measurement of the organic solvent concentration. The measuring conditions for this analysis are as follows.

Apparatus: GG-14A manufactured by Shimadzu Corporation
Column: CBP20-M 50-0.25
Detector: FID
Amount of injection: 1 µl to 5 µl
Carrier gas: He 2.5 kg/cm$^2$
Hydrogen flow rate: 0.6 kg/cm$^2$
Air flow rate: 0.5 kg/cm$^2$
Chart speed: 5 mm/min
Sensitivity: Range 101×Atten 20
Column temperature: 40° C.
Injection Temp: 150° C.

Second Embodiment

Applied Example

Next, a second embodiment as an applied example of the first embodiment will be explained. In the second embodiment, a complex will be synthesized, with appropriate setting of the timings to add plural kinds of ring-opening-polymerizable monomers. In the present embodiment, the complex means a copolymer including two or more kinds of polymer segments obtained by polymerizing monomers by dividing them into a plurality of system lines, or a mixture of two or more kinds of polymers obtained by polymerizing monomers by dividing them into a plurality of system lines. Two methods for synthesizing a stereo complex, as an example of the complex, will be explained below.

<First Method>

Figure 5:
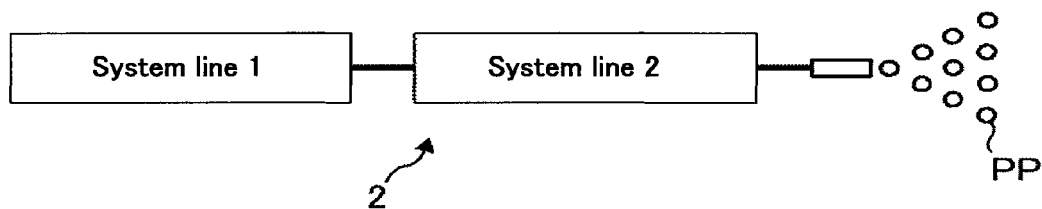
FIG. 5 is an exemplary diagram showing an example of a particle manufacturing apparatus.
Figure 6:
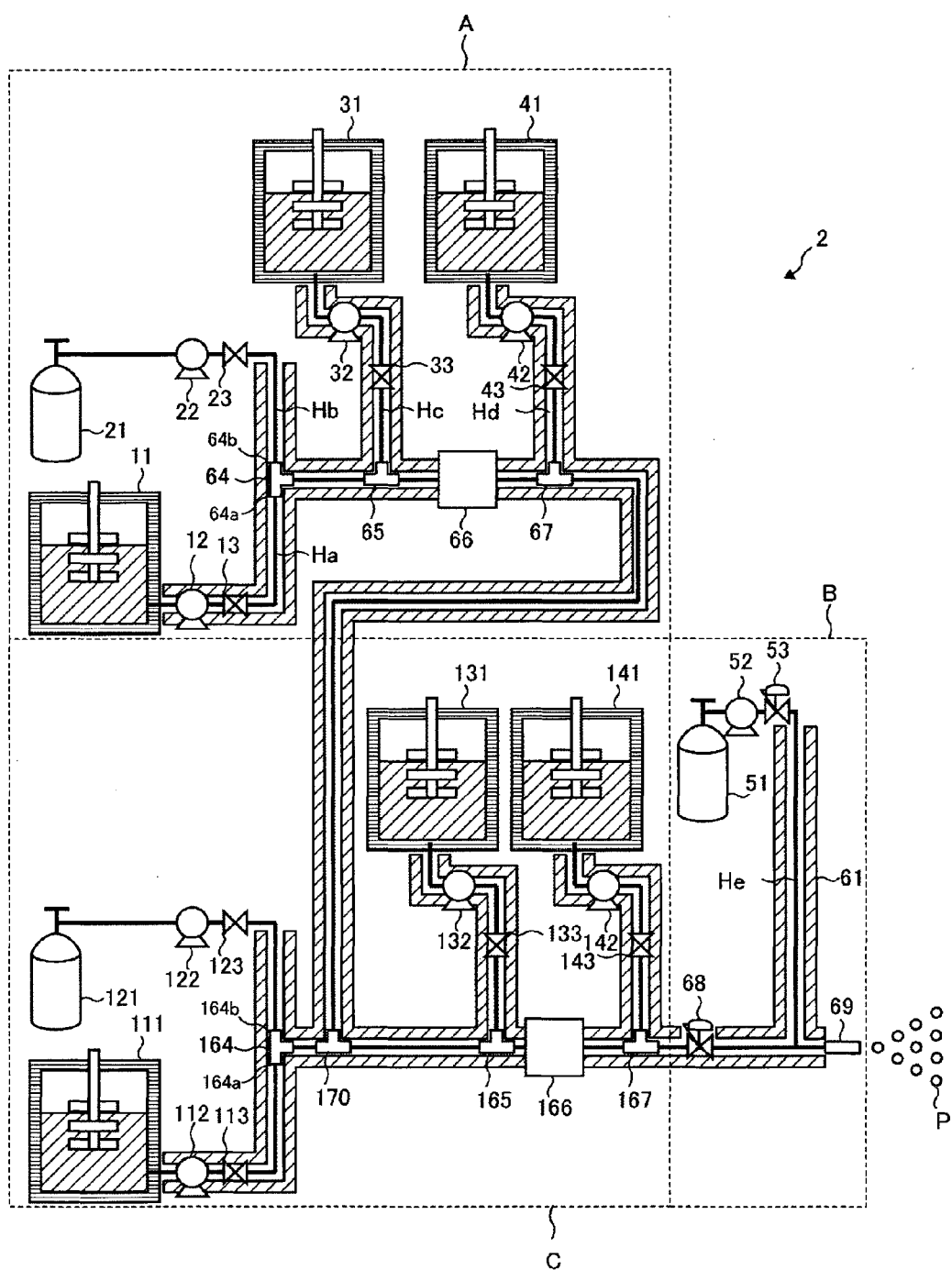
FIG. 6 is an exemplary diagram showing an example of a particle manufacturing apparatus.

The first method will now be explained with reference to FIG. 5 and FIG. 6. FIG. 5 and FIG. 6 are exemplary diagrams showing an example of a particle manufacturing apparatus used in the first method. In the first method, a polymer is produced in the same manufacturing method as the first embodiment in a system line 1 of a particle manufacturing apparatus 2 of FIG. 5, and the obtained polymer as an intermediate product is brought into contact with a newly introduced second ring-opening-polymerizable monomer in a second system line 2 to be mixed therewith continuously in the presence of the first compressible fluid, to thereby manufacture particles PP as a complex product (final polymer product). It is also possible to manufacture a complex product containing three or more kinds of segments, by repeatedly providing system lines similar to the system line 2 of the particle manufacturing apparatus 2 of FIG. 5 in series.

Next, a specific example of the particle manufacturing apparatus 2 will be explained with reference to FIG. 6. The particle manufacturing apparatus 2 includes as a system line 1, a similar configuration to the section A (see FIG. 4) of the particle manufacturing apparatus 1 of the first embodiment, and as a system line 2, a section C and a similar configuration to the section B of the particle manufacturing apparatus 1 of the first embodiment. The sections A and B of the particle manufacturing apparatus 2 will not be explained in detail because they are almost the same as the sections A and B of the particle manufacturing apparatus 1.

In the particle manufacturing apparatus 2, the section C is the same as the section A except that it includes a mixer 170 between a mixer 164 and a mixer 165 for mixing with the polymer containing the first compressible fluid that is produced in the section A.

In the section C of the system line 2, a monomer tank 111 is the same as the monomer tank 11 of the section A of the system line 1, except that the substance stored therein is a second ring-opening-polymerizable monomer. In the section C of the system line 2, a cylinder 121, a catalyst tank 131, and an additive tank 141 are the same as the cylinder 21, the catalyst tank 31, and the additive tank 41 of the section A of the system line 1, and the compressible fluid, the catalyst, and the additives stored therein may be the same as or different from those stored in the section A. In the section C of the system line 2, pumps (112, 122, 132, 142), valves (113, 123, 133, 143), mixers (164, 165, 167), and a reaction vessel 166 are the same as the pumps (12, 22, 32, 42), the valves (13, 23, 33, 43), the mixers (64, 65, 67), and the reaction vessel 66 of the section A of the system line 1 respectively. The mixer 164 includes a monomer inlet 164a for introducing a ring-opening-polymerizable monomer and a compressible fluid inlet 164b for introducing a compressible fluid.

The mixer 170 is an apparatus that mixes a melted product Y1-2 supplied from the mixer 164 and containing the second ring-opening-polymerizable monomer with a melted polymer product Y3 as an intermediate product supplied from the section A of the system line 1 to thereby produce a melted product Y4. The mixer 170 is not particularly limited as long as it can uniformly mix the melted product Y1-2 containing the second ring-opening-polymerizable monomer with the melted polymer product Y3 supplied from the system line 1 obtained by ring-opening-polymerizing the first ring-opening-polymerizable monomer, and may be the same one as or a different one from the mixer 164.

In the first method, the first ring-opening-polymerizable monomer (e.g., L-lactide) is polymerized in the reaction vessel 66, and after the reaction is completed quantitatively, further polymerized in the reaction vessel 166 to which an enantiomer ring-opening-polymerizable monomer (e.g., D-lactide) as an example of the second ring-opening-polymerizable monomer is added. As a result, a stereo block copolymer is obtained. A melted product Y5 containing the obtained stereo block copolymer is subjected to the same granulating step as the first embodiment to become particles PP made of the complex. This method is very useful because it barely causes racemization as it can promote the reaction at equal to or lower than the melting point of the ring-opening-polymerizable monomer with little ring-opening-polymerizable monomer remaining, and because it can obtain the particles PP with a one-stage efficient reaction.

<Second Method>

Figure 7:
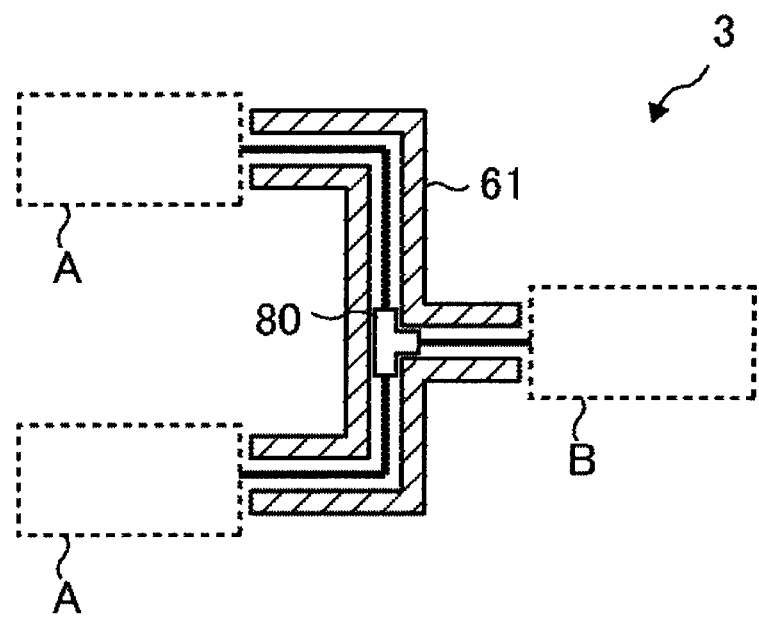
FIG. 7 is an exemplary diagram showing an example of a particle manufacturing apparatus.

Next, the second method will be explained with reference to FIG. 7. FIG. 7 is an exemplary diagram showing a particle manufacturing apparatus 3 used in the second method. In the second method, plural kinds of polymers each manufactured by the manufacturing method of the first embodiment are mixed continuously in the presence of the first compressible fluid, to thereby obtain a complex product. The plural kinds of polymers are polymerization products of ring-opening-polymerizable monomers that are each other's enantiomers. The particle manufacturing apparatus 3 includes: a polymerizing section in which similar ones to the section A of the particle manufacturing apparatus 1 of the first embodiment are arranged in parallel; a mixer 80; and a granulating section similar to the section B of the particle manufacturing apparatus 1 of the first embodiment.

The mixer 80 is not particularly limited as long as it can mix the plural kinds of polymers supplied from the sections A of the respective system lines, and examples thereof include a conventional T-junction, a swirl mixer that uses swirl flows actively, a static mixer, and a central collision mixer that makes two liquid flows collide in the mixing area. It is also preferable that the mixer 80 is temperature-controllable by a heater, a jacket, etc. The temperature for mixing the polymers with the mixer 80 (mixing temperature) can be set to the same temperature as the polymerization reaction temperature in the reaction vessels 66 of the sections A of the respective system lines. The mixer 80 may also include a separate mechanism for supplying a compressible fluid to the polymers to be mixed.

The polymer inlets of the mixer 80 are connected to the discharging ports of the sections A of the respective system lines through a pressure-tight ultra high pressure pipe or the like. Here, the discharging port of the section A means the discharging port of the reaction vessel 66 or of the mixer 67. In any case, the polymers produced in the sections A of the respective system lines can be supplied to the mixer 80 as kept in the melted state, without being returned to normal pressure. As a result, the viscosities of the respective polymers decrease in the presence of the compressible fluid, which makes it possible for the two or more kinds of polymers to be mixed with the mixer 80 at a far lower temperature. FIG. 7 shows an example in which two sections A are arranged in parallel with an ultra high pressure pipe or the like, but three or more sections A may be arranged in parallel with a plurality of joints.

In the second method, L-form and D-form monomers (e.g., lactide) are each polymerized in the polymerizing steps of the sections A beforehand in the presence of the first compressible fluid. Then, the respective polymers obtained from the polymerization are mixed in the presence of the first compressible fluid, to thereby obtain a complex. Generally, polymers such as polylactic acid often decompose when heated and dissolved again, even if they contain infinitely little remaining ring-opening-polymerizable monomer. The second method is useful because like the first method, it can suppress racemization and thermal degradation of polylactic acid having a low viscosity having been melted in the presence of the first compressible fluid, by mixing it at equal to or lower than its melting point.

Manufacture of a stereo complex by polymerizing ring-opening-polymerizable monomers that are each other's enantiomers has been explained for the first method and the second method. However, the ring-opening-polymerizable monomers used in the present embodiment need not be each other's enantiomers. Furthermore, by combining the first method and the second method, it is possible to mix block copolymers with each other to form a stereo complex.

<<Effect of the Embodiment>>

According to the polymerization method of the present embodiment, it is possible to provide a polymer excellent in low-costliness, low environmental hazardousness, power-saving efficiency, and resource-saving efficiency, and excellent in moldability and thermal stability, for the reasons below.

(1) The reaction progresses at a lower temperature than by a melt polymerization method for promoting the reaction at a high temperature (e.g., higher than 150° C.).

(2) The reaction progressing at a low temperature causes substantially no side reaction, enabling a polymer to be produced at a high yield relative to the ring-opening-polymerizable monomer added (i.e., there is little ring-opening-polymerizable monomer remained unreacted.) Therefore, a purifying step for removing any unreacted ring-opening-polymerizable monomer that would reduce the moldability and the thermal stability can be simplified or omitted.

(3) When an organic catalyst is selected as the catalyst, the polymer does not contain a metal catalyst. Therefore, no metal catalyst removing step is necessary.

(4) In a polymerization method using an organic solvent, a step of removing the solvent is necessary in order to use the obtained polymer in its solid state. The polymerization method of the present embodiment is free from a waste liquid, etc. because it uses a compressible fluid, and can obtain a dry polymer in a one-stage process. Therefore, the method can simplify or do without a drying step.

(5) The use of the compressible fluids can realize a ring-opening-polymerization reaction without an organic solvent.

(6) The ring-opening-polymerization reaction progresses uniformly, because it is promoted with a catalyst after the ring-opening-polymerizable monomer is melted in the compressible fluid. Therefore, the polymer obtained by this method is suitably used for manufacturing a copolymer with an enantiomer or with another kind of monomer.

EXAMPLES

The present embodiment will be explained in greater detail below with Examples and Comparative Examples. However, the present invention is not limited to these Examples. In Examples and Comparative Examples, the following evaluation was conducted.

<Ratio of Monomer Converted to Polymer>

Ratio of Lactide Converted to Polymer

With a nuclear magnetic resonator JNM-AL300 manufactured by JEOL Ltd., nuclear magnetic resonance measurement of the polymer product (polylactic acid) to constitute the particles was performed in heavy chloroform. In this case, the ratio of a quartet peak area attributed to lactide (4.98 ppm to 5.05 ppm) to a quartet peak area attributed to polylactic acid (5.10 ppm to 5.20 ppm) was calculated, and the hundredfold of this ratio was used as the amount of unreacted monomer (mol %). The ratio of conversion to the polymer was the value obtained by subtracting the calculated amount of unreacted monomer from 100.

Ratio of $\epsilon$-Caprolactone Converted to Polymer

With a nuclear magnetic resonator JNM-AL300 manufactured by JEOL Ltd., nuclear magnetic resonance measurement of the obtained polycaprolactone product was performed in heavy chloroform. In this case, the ratio of a triplet peak area attributed to caprolactone (4.22 ppm to 4.25 ppm) to a triplet peak area attributed to polycaprolactone (4.04 ppm to 4.08 ppm) was calculated, and the hundredfold of this ratio was used as the amount of unreacted caprolactone monomer (mol %). The ratio of conversion to the polymer was the value obtained by subtracting the calculated amount of each unreacted monomer from 100.

Ratio of Propylene Carbonate Converted to Polymer

With a nuclear magnetic resonator JNM-AL300 manufactured by JEOL Ltd., nuclear magnetic resonance measurement of the obtained polycarbonate product was performed in heavy chloroform. In this case, the ratio of a triplet peak area attributed to propylene carbonate (4.54 ppm) to a triplet peak area attributed to polycarbonate (4.22 ppm to 4.25 ppm) was calculated, and the hundredfold of this ratio was used as the amount of unreacted propylene carbonate monomer (mol %). The ratio of conversion to the polymer was the value obtained by subtracting the calculated amount of each unreacted monomer from 100.

<Viscosity of Melted Product>

With a vibration viscometer (XL/7 manufactured by Hydramotion Ltd.), a polymer product to constitute the particles was put in a high-pressure cell as a sample, and viscosity thereof was measured on the same temperature and pressure conditions as those when the melted product was jetted (e.g., at 40° C. and 50 MPa). In this case, the sample was set in the measuring unit, and temperature and pressure were controlled to the conditions at which the melted product was jetted. When the viscosity was stabilized to a constant level, this viscosity was measured as the viscosity of the melted product Y3 when it was jetted on those temperature and pressure conditions.

<Continuous Productivity>

After the particle manufacturing apparatuses (1, 2, 3) were continuously operated for 8 hours or longer, the mixer 64 was disassembled to visually evaluate whether any gelated product adhered to the single-pipe portion, screws, etc. As the visual evaluation results, no adhesion of gelated product was graded A, and any adhesion of gelated product was graded B.

<Particles' Volume-Average Particle Size Dv and Number-Average Particle Size Dn, and Ratio (Dv/Dn)>

The volume-average particle size Dv and number-average particle size Dn of the colored particles and the ratio (Dv/Dn) were measured with a particle size measuring instrument ("Coulter Counter TAII" manufactured by Coulter Electronics Ltd.).

First, a surfactant (polyoxyethylene alkylether, Product Name: DRYWELL) (0.1 mL to 5 mL) was added as a dispersant to an electrolytic aqueous solution (100 mL to 150 mL). Here, a 1% by mass NaCl aqueous solution prepared with primary sodium chloride (ISOTON-II manufactured by Coulter Ltd.) was used as the electrolytic solution. Then, a measuring target sample (2 mg to 20 mg) was added. The electrolytic solution in which the sample was suspended was subjected to dispersion for 1 minute to 3 minutes with an ultrasonic dispersion apparatus. The volume and number of colored particles were measured with the measuring instrument mentioned above, with an aperture of 100 μm, to thereby derive a volume distribution and a number distribution. From the obtained distributions, the volume-average particle size Dv and the number-average particle size Dn of the colored particles were obtained.

Channels used were 13 channels, namely channels of 2.00 μm or greater but less than 2.52 μm; 2.52 μm or greater but less than 3.17 μm; 3.17 μm or greater but less than 4.00 μm; 4.00 μm or greater but less than 5.04 μm; 5.04 μm or greater but less than 6.35 μm; 6.35 μm or greater but less than 8.00 μm; 8.00 μm or greater but less than 10.08 μm; 10.08 μm or greater but less than 12.70 μm; 12.70 μm or greater but less than 16.00 μm; 16.00 μm or greater but less than 20.20 μm; 20.20 μm or greater but less than 25.40 μm; 25.40 μm or greater but less than 32.00 μm; and 32.00 μm or greater but less than 40.30 μm, and the target particles were of a particle size of 2.00 μm or greater but less than 40.30 μm.

<Molecular Weight>

The molecular weight was measured by GPC (Gel Permeation Chromatography) on the following conditions.

Apparatus: GPC-8020 (manufactured by Tosoh Corporation)
Columns: TSK G2000HXL and G4000HXL (manufactured by Tosoh Corporation)
Temperature: 40° C.
Solvent: THF (tetrahydrofuran)
Flow rate: 1.0 mL/min A polymer having a concentration of 0.5% by mass (1 mL) was injected, and the molecular weight distribution of the polymer was measured on the conditions described above. A molecular weight calibration curve generated based on a monodisperse polystyrene standard sample was applied to the obtained distribution to calculate the number-average molecular weight Mn and the weight-average molecular weight Mw of the polymer. The molecular weight distribution is a value obtained by dividing Mw by Mn.

Example 1

In Example 1, resin particles of a polymer product obtained from ring-opening-polymerization of a mixture of L-lactide and D-lactide (90/10) were manufactured with the particle manufacturing apparatus 1 of FIG. 4. In Example 1, a carbonic acid gas (carbon dioxide) cylinder was used as the cylinder 21, and a nitrogen cylinder was used as the cylinder 51. In Example 1, the additive tank 41, the pump 42, and the mixer 67 were not used.

Lactide, which is a ring-opening-polymerizable monomer (a mixture of L-lactide and D-lactide (mass ratio: 90/10), was put into the monomer tank 1 of the particle manufacturing apparatus 1 shown in FIG. 4, and heated and melted. Lauryl alcohol, as an initiator, was put into the monomer tank 11 such that its content was 1 mol relative to 99 mol of lactide. The pump 22 was actuated and the valve 23 was opened to introduce carbon dioxide as the first compressible fluid such that it became 40° C. and 50 MPa. Also, the pump 12 was actuated and the valve 13 was opened to bring the raw materials in the monomer tank 11, which were the mixture of lactide and lauryl alcohol, into contact with the first compressible fluid continuously and mix them in the mixer 64 (static mixer) to obtain a melted product Y1. At this time, the raw materials were fed to the mixer 64 at a rate of 190 parts by mass/min, and the first compressible fluid was fed to the mixer 64 at a rate of 10 parts by mass/min.

Next, the pump 32 was actuated and the valve 33 was opened to supply the catalyst 1,8-diazabicyclo[5.4.0]undec-7-ene (DBU) put into the catalyst tank 31 to the mixer 65 (static mixer) such that the content of the catalyst was 0.1 mol relative to 99.9 mol of lactide, and mix the catalyst with the melted product Y1 to thereby obtain a melted product Y2. The obtained melted product Y2 was introduced into the reaction vessel 66 (tube reactor) to promote ring-opening-polymerization of lactide to thereby obtain a melted product Y3 containing a polymer product. The average dwell time of the melted products (Y2, Y3) in the reaction vessel 66 was set to about 20 minutes.

Next, the obtained melted product Y3 was jetted continuously from the nozzle 69 having a nozzle diameter of 400 μm, with supercritical nitrogen prepared as the second compressible fluid supplied to the melted product Y3 with the pump 52 and the heater 61 such that the fluid was maintained to 50 MPa and 40° C. The jetted melted product Y3 became particles and solidified, to thereby obtain [Resin Particles 1].

The ratio of monomer converted to polymer, the viscosity of the melted product Y3, and continuous productivity obtained in Example 1 are shown in Table 1. The volume-average particle size Dv and the number-average particle size Dn of [Resin Particles 1] and the ratio (Dv/Dn) are also shown in Table 1. The number-average molecular weight Mn and the molecular weight distribution (Mw/Mn) of the polymer product constituting [Resin Particles 1] are also shown in Table 1.

Examples 2 to 9

[Resin Particles 2 to 9] were manufactured in the same operation as Example 1 except that the amount of the initiator, the kind of the catalyst, the feed amount of the raw materials, the feed amount of the first compressible fluid, the process temperature, the process pressure, the average dwell time of the melted products (Y2, Y3) in the reaction vessel 66, and the nozzle diameter of the nozzle 69 were changed as shown in Table 1 and Table 2. In each table, DMAP indicates N,N-dimethyl-4-aminopyridine, DABCO indicates 1,4-diazabicyclo[2.2.2]octane, ITBU indicates 1,3-di-tert-butylimidazol-2-ylidene, and tin indicates tin di(2-ethylhexanoate).

The ratio of monomer converted to polymer, the viscosity of the melted product Y3, and continuous productivity obtained in Examples 2 to 9 are shown in Table 1 and Table 2. The volume-average particle size Dv and the number-average particle size Dn of [Resin Particles 2 to 9] and the ratio (Dv/Dn) are also shown in Table 1 and Table 2. The number-average molecular weight Mn and the molecular weight distribution (Mw/Mn) of the polymer products constituting [Resin Particles 2 to 9] are also shown in Table 1 and Table 2.

Examples 10 to 12

[Resin Particles 10 to 11] were manufactured in the same operation as Example 2, except that the cylinder 51 was changed from the nitrogen cylinder to a carbonic acid gas (carbon dioxide) cylinder in Example 10, and to an air cylinder in Example 11 (Examples 10 and 11). [Resin Particles 12] were manufactured in the same manner as Example 2, except that the mixer 64 and the mixer 65 were changed to a T-junction (Example 12).

The ratio of monomer converted to polymer, the viscosity of the melted product Y3, and continuous productivity obtained in Examples 10 to 12 are shown in Table 3. The volume-average particle size Dv and the number-average particle size Dn of [Resin Particles 10 to 12] and the ratio (Dv/Dn) are also shown in Table 3. The number-average molecular weight Mn and the molecular weight distribution (Mw/Mn) of the polymer products constituting [Resin Particles 10 to 12] are also shown in Table 3.

Comparative Example 1

The same operation as Example 1 was performed, except that the valve 23 was closed and the pump 22 was not used. However, a polymerization reaction did not progress sufficiently. In Table 3, the symbol "-" indicates that there was so much monomer remained unreacted that it was impossible to measure the value.

Example 20

[Resin Particles 20] were manufactured in the same operation as Example 1, except that the amount of the initiator, the kind of the catalyst, the process temperature, and the nozzle diameter were changed as shown in Table 3. In the table, tin indicates tin di(2-ethylhexanoate).

The ratio of monomer converted to polymer, the viscosity of the melted product Y3, and continuous productivity obtained in Example 20 are shown in Table 3. The volume-average particle size Dv and the number-average particle size Dn of [Resin Particles 20] and the ratio (Dv/Dn) are also shown in Table 3. The number-average molecular weight Mn and the molecular weight distribution (Mw/Mn) of the polymer product constituting [Resin Particles 20] are also shown in Table 3.

TABLE 1

| | Example 1 | Example 2 | Example 3 | Example 4 | Example 5 |
|---|---|---|---|---|---|
| Monomer kind | lactide | lactide | lactide | lactide | lactide |
| Initiator amount (mol %) | 1.0 | 1.0 | 0.5 | 0.5 | 0.2 |
| Catalyst kind | DBU | DBU | DMAP | DMAP | DMAP |
| Raw materials feed amount (part by mass/min) | 190 | 190 | 190 | 380 | 190 |
| First compressible fluid feed amount (part by mass/min) | 10 | 10 | 10 | 20 | 10 |
| Process temp. (° C.) | 40 | 60 | 100 | 100 | 140 |
| Process pressure (MPa) | 50 | 70 | 40 | 60 | 45 |
| Average dwell time (min) | 20 | 20 | 20 | 10 | 20 |
| Second compressible fluid kind | nitrogen | nitrogen | nitrogen | nitrogen | nitrogen |
| Nozzle diameter | 400 | 300 | 400 | 300 | 200 |
| Polymer conversion ratio (mol %) | 100 | 100 | 100 | 100 | 100 |
| Melt product viscosity (mPa · s) | 700 | 320 | 440 | 230 | 40 |
| Continuous productivity | A | A | A | A | A |
| Volume-avg. particle size (Dv) (μm) | 87.2 | 40.3 | 60.1 | 31.5 | 12.4 |
| Number-avg. particle size (Dn) (μm) | 10.7 | 8.3 | 8.7 | 7.4 | 6.0 |
| Dv/Dn | 8.15 | 4.86 | 6.90 | 4.26 | 2.07 |
| Number-avg. molecular weight (Mn) | 12,000 | 13,000 | 19,000 | 18,000 | 40,000 |
| Mw/Mn | 1.8 | 1.5 | 1.6 | 1.6 | 1.7 |

TABLE 2

| | Example 6 | Example 7 | Example 8 | Example 9 |
|---|---|---|---|---|
| Monomer kind | lactide | lactide | lactide | lactide |
| Initiator amount (mol %) | 0.8 | 0.1 | 0.8 | 0.5 |
| Catalyst kind | DABCO | ITBU | tin | tin |
| Raw materials feed amount (part by mass/min) | 190 | 190 | 570 | 190 |
| First compressible fluid feed amount (part by mass/min) | 10 | 10 | 30 | 10 |

TABLE 2-continued

|  | Example 6 | Example 7 | Example 8 | Example 9 |
|---|---|---|---|---|
| Process temp. (° C.) | 120 | 120 | 80 | 150 |
| Process pressure (MPa) | 70 | 20 | 60 | 65 |
| Average dwell time (min) | 20 | 20 | 500 | 20 |
| Second compressible fluid kind | nitrogen | nitrogen | nitrogen | nitrogen |
| Nozzle diameter | 100 | 500 | 200 | 100 |
| Polymer conversion ratio (mol %) | 100 | 100 | 100 | 100 |
| Melt product viscosity (mPa·s) | 22 | 2,000 | 150 | 5 |
| Continuous productivity | A | A | A | A |
| Volume-avg. particle size (Dv) (μm) | 7.3 | 186.2 | 21.7 | 5.2 |
| Number-avg. particle size (Dn) (μm) | 5.6 | 19.8 | 6.9 | 4.6 |
| Dv/Dn | 1.30 | 9.40 | 3.14 | 1.13 |
| Number avg. molecular weight (Mn) | 13,000 | 90,000 | 12,000 | 22,000 |
| Mw/Mn | 1.9 | 1.8 | 1.9 | 1.7 |

TABLE 3

|  | Example 10 | Example 11 | Example 12 | Comparative example 1 | Example 20 |
|---|---|---|---|---|---|
| Monomer kind | lactide | lactide | lactide | lactide | lactide |
| Initiator amount (mol %) | 1.0 | 1.0 | 1.0 | 1.0 | 0.2 |
| Catalyst kind | DBU | DBU | DBU | DBU | tin |
| Raw materials feed amount (part by mass/min) | 190 | 190 | 190 | 190 | 190 |
| First compressible fluid feed amount (part by mass/min) | 10 | 10 | 10 | 0 | 10 |
| Process temp. (° C.) | 60 | 60 | 60 | 40 | 170 |
| Process pressure (MPa) | 70 | 70 | 70 | 50 | 50 |
| Average dwell time (min) | 20 | 20 | 20 | 20 | 20 |
| Second compressible fluid kind | carbon dioxide | air | nitrogen | nitrogen | nitrogen |
| Nozzle diameter | 300 | 300 | 300 | 400 | 100 |
| Polymer conversion ratio (mol %) | 100 | 100 | 100 | — | 100 |
| Melt product viscosity (mPa·s) | 310 | 320 | 300 | — | 13 |
| Continuous productivity | A | A | A | B | A |
| Volume-avg. particle size (Dv) (μm) | 38.3 | 40.6 | 37.1 | — | 5.8 |
| Number-avg. particle size (Dn) (μm) | 8.2 | 8.3 | 8.0 | — | 4.9 |
| Dv/Dn | 4.67 | 4.89 | 4.64 | — | 1.18 |
| Number-avg. molecular weight (Mn) | 12,000 | 13,000 | 12,000 | — | 38,000 |
| Mw/Mn | 1.5 | 1.5 | 1.5 | — | 1.8 |

Example 13

In Example 13, resin particles were manufactured with the particle manufacturing apparatus 2 of FIG. 6. The particle manufacturing apparatus 2 of FIG. 6 is constituted by linking the section A of the particle manufacturing apparatus 1 of FIG. 4 to the section C in series. In Example 13, a carbonic acid gas (carbon dioxide) cylinder was used as the cylinder 21. A nitrogen cylinder was used as the cylinder 51. In Example 13, the catalyst tank 131, the additive tanks (41, 141), the pumps (42, 132, 142), and the mixers (67, 165, 167) were not used.

As a first monomer, a ring-opening-polymerizable monomer L-lactide was put into the monomer tank 11 of the particle manufacturing apparatus 2 shown in FIG. 6, and heated and melted. As an initiator, lauryl alcohol was put into the monomer tank 11 such that the content thereof was 1.0 mol relative to 99 mol of L-lactide. The pump 22 was actuated and the valve 23 was opened to introduce carbon dioxide as the first compressible fluid such that it was maintained to 120° C. and 60 MPa. Further, the pump 12 was actuated and the valve 13 was opened to bring the raw materials in the monomer tank 11, which were the mixture of L-lactide and lauryl alcohol, into contact with the first compressible fluid continuously and mix them in the mixer 64 (static mixer) to thereby obtain a melted product Y1-1. At this time, the raw materials were fed to the mixer 64 at a rate of 190 parts by mass/min, and the first compressible fluid was fed to the mixer 64 at a rate of 10 parts by mass/min.

Next, the pump 32 was actuated and the valve 33 was opened to supply the catalyst DMAP put into the catalyst tank 31 to the mixer 65 (static mixer) such that the content of the catalyst was 0.1 mol relative to 99.9 mol of L-lactide, and mix the catalyst with the melted product Y1-1, to thereby obtain a melted product Y2. The obtained melted product Y2 was introduced to the reaction vessel 66 (tube reactor) to promote ring-opening-polymerization of L-lactide, to thereby obtain an intermediate polymer product (melted product Y3) in a melted state. The average dwell time of the melted products (Y2, Y3) in the reaction vessel 66 was set to about 20 minutes.

Meanwhile, as a second monomer, a ring-opening-polymerizable monomer D-lactide was put into the monomer tank 111 of the particle manufacturing apparatus 2 shown in FIG. 6 and heated and melted. As an initiator, lauryl alcohol was put into the monomer tank 111 such that the content thereof was 1.0 mol relative to 99 mol of D-lactide. The pump 122 was actuated and the valve 123 was opened to introduce carbon dioxide as the first compressible fluid such that it was maintained to 120° C. and 60 MPa. Further, the pump 112 was actuated and the valve 113 was opened to bring the raw materials in the monomer tank 111, which were the mixture of D-lactide and lauryl alcohol, into contact with the first compressible fluid continuously, and mix them in the mixer 164 (static mixer) to thereby obtain a melted product Y1-2. At this time, the raw materials were fed to the mixer 164 at a rate of 190 parts by mass/min, and the first compressible fluid was fed to the mixer 164 at a rate of 10 parts by mass/min.

The intermediate polymer product (melted product Y3) obtained in the section A and the melted product Y1-2 were both supplied to the mixer 170 (static mixer) and mixed with each other, to thereby obtain a melted product Y4. The obtained melted product Y4 was introduced to the reaction vessel 166 (tube reactor) to promote a polymerization reaction of the intermediate polymer product and the second monomer D-lactide, to thereby obtain a melted product Y5 containing a polymer product. The average dwell time of the melted products (Y4, Y5) in the reaction vessel 166 was set to about 20 minutes.

Next, the obtained melted product Y5 was jetted continuously from the nozzle 69 having a nozzle diameter of 200 μm, with supercritical nitrogen prepared as the second compressible fluid supplied to the melted product Y5 with the pump 52 and the heater 61 such that the fluid was maintained to 60 MPa and 120° C. The jetted melted product Y5 became particles and solidified, to thereby obtain [Resin Particles 13].

The ratio of monomer converted to polymer, the viscosity of the melted product Y5, and continuous productivity obtained in Example 13 are shown in Table 4. The volume-average particle size Dv and the number-average particle size Dn of [Resin Particles 13] and the ratio (Dv/Dn) are also shown in Table 4. The number-average molecular weight Mn and the molecular weight distribution (Mw/Mn) of the polymer product constituting [Resin Particles 13] are also shown in Table 4.

Examples 14 to 16

[Resin Particles 14 to 16] were manufactured in the same operation as Example 13, except that the kind of the initiator and the amount of the initiator were changed as shown in Table 4.

The ratio of monomer converted to polymer, the viscosity of the melted product Y5, and continuous productivity obtained in Examples 14 to 16 are shown in Table 4. The volume-average particle size Dv and the number-average particle size Dn of [Resin Particles 14 to 16] and the ratio (Dv/Dn) are also shown in Table 4. The number-average molecular weight Mn and the molecular weight distribution (Mw/Mn) of the polymer products constituting [Resin Particles 14 to 16] are also shown in Table 4.

TABLE 4

|  | Example 13 | Example 14 | Example 15 | Example 16 |
|---|---|---|---|---|
| First monomer kind | L-lactide | L-lactide | L-lactide | L-lactide |
| Second monomer kind | D-Lactide | D-Lactide | D-Lactide | D-Lactide |
| Initiator kind | lauryl alcohol | hexanediol | poly-caprolactone diol | polybutylene adipate |
| Initiator amount (mol %) | 1.0 | 1.0 | — | — |
| Initiator amount (% by mass) | — | — | 20 | 20 |
| Second compressible fluid kind | nitrogen | nitrogen | nitrogen | nitrogen |
| Nozzle diameter | 200 | 200 | 200 | 200 |
| Polymer conversion ratio (mol %) | 100 | 100 | 100 | 100 |
| Melted product viscosity (mPa·s) | 60 | 68 | 62 | 65 |
| Continuous productivity | A | A | A | A |
| Volume-avg. particle size (Dv)(μm) | 14.3 | 14.8 | 14.5 | 15.0 |
| Number-avg. particle size (Dn)(μm) | 6.0 | 6.1 | 6.2 | 6.1 |
| Dv/Dn | 2.38 | 2.42 | 2.33 | 2.45 |
| Number-avg. molecular weight (Mn) | 18,000 | 17,000 | 18,000 | 18,000 |
| Mw/Mn | 1.9 | 1.9 | 1.9 | 1.9 |

In Table 4, polycaprolactone diol is manufactured by Wako Pure. Chemical Industries, Ltd. Polybutylene adipate is SANESTER 4620 manufactured by Sanyo Chemical Industries, Ltd.

Example 17

In Example 17, resin particles were manufactured with the particle manufacturing apparatus 3 of FIG. 7. The particle manufacturing apparatus 3 of FIG. 7 was constituted by arranging the sections A of the particle manufacturing apparatus 1 of FIG. 4 in parallel and coupling them via the mixer 80. In Example 17, a carbonic acid gas (carbon dioxide) cylinder was used as the cylinder 21. A nitrogen cylinder was used as the cylinder 51. In Example 17, the additive tank 41, the pump 42, and the mixer 67 were not used in both of the system line 1 and the system line 2.

A ring-opening-polymerizable monomer L-lactide was put into the monomer tank 11 of the system line 1 of the particle manufacturing apparatus 3 shown in FIG. 7, and heated and melted. As an initiator, lauryl alcohol was put into the monomer tank 11 such that the content thereof was 0.5 mol relative to 99.5 mol of L-lactide. The pump 22 was actuated and the valve 23 was opened to introduce carbon dioxide prepared as the first compressible fluid such that it was maintained to 120° C. and 60 MPa. Further, the pump 12 was actuated and the valve 13 was opened to bring the raw materials in the monomer tank 11, which were the mixture of L-lactide and lauryl alcohol, into contact with the first compressible fluid continuously, and mix them in the mixer 64 (static mixer) to thereby obtain a melted product Y1-1. At this time, the raw materials were fed to the mixer 64 at a rate of 190 parts by mass/min, and the first compressible fluid was fed to the mixer 64 at a rate of 10 parts by mass/min.

Next, the pump 32 was actuated and the valve 33 was opened to supply a catalyst DMAP put into the catalyst tank 31 to the mixer 65 (static mixer) such that the content of the catalyst was 0.1 mol relative to 99.9 mol of L-lactide, and mix the catalyst with the melted product Y1-1 to obtain a melted product Y2-1. The obtained melted product Y2-1 was introduced to the reaction vessel 66 (tube reactor) to promote ring-opening-polymerization of L-lactide to thereby obtain a melted product Y3-1 of poly(L-lactide).

In the system line 2, the same operation as in the system line 1 was performed using D-lactide as a ring-opening-polymerizable monomer to thereby obtain a melted product Y3-2 of poly(D-lactide). Poly(L-lactide) obtained in the system line 1 and poly(D-lactide) obtained in the system line 2 were supplied to the mixer 80 (static mixer) with both containing the first compressible fluid, and mixed well with each other to thereby obtain a melted product Y6.

Next, the obtained melted product Y6 was jetted continuously from the nozzle 69 having a nozzle diameter of 200 μm, with supercritical nitrogen prepared as the second compressible fluid supplied to the melted product Y6 with the pump 52 and the heater 61 such that the fluid was maintained to 60 MPa and 120° C. The jetted melted product Y6 became particles and solidified, to thereby obtain [Resin Particles 17].

The ratio of monomer converted to polymer, the viscosity of the melted product Y6, and continuous productivity obtained in Example 17 are shown in Table 5. The volume-average particle size Dv and the number-average particle size Dn of [Resin Particles 17] and the ratio (Dv/Dn) are also shown in Table 5. The number-average molecular weight Mn and the molecular weight distribution (Mw/Mn) of the polymer product constituting [Resin Particles 17] are also shown in Table 5.

Examples 18 and 19

[Resin Particles 18 and 19] were manufactured in the same operation as Example 17, except that the kind of the monomers and the feed amount of the raw materials were changed as shown in Table 5.

The ratio of monomer converted to polymer, the viscosity of the melted product Y6, and continuous productivity obtained in Examples 18 and 19 are shown in Table 5. The volume-average particle size Dv and the number-average particle size Dn of [Resin Particles 18 and 19] and the ratio (Dv/Dn) are also shown in Table 5. The number-average molecular weight Mn and the molecular weight distribution (Mw/Mn) of the polymer products constituting [Resin Particles 18 and 19] are also shown in Table 5.

Because a manufacturing method that did not use an organic solvent was used in Examples 1 to 20, [Resin Particles 1 to 20] contained substantially no organic solvent.

TABLE 5

| | Example 17 | | Example 18 | | Example 19 | |
|---|---|---|---|---|---|---|
| | System line 1 | System line 2 | System line 1 | System line 2 | System line 1 | System line 2 |
| Monomer kind | L-lactide | D-lactide | L-lactide | ε-caprolactone | L-lactide | propylene carbonate |
| Raw materials feed amount (part by mass/min) | 190 | 190 | 570 | 190 | 190 | 570 |
| First compressible fluid feed amount (part by mass/min) | 10 | 10 | 30 | 10 | 10 | 30 |
| Second compressible fluid kind | nitrogen | | nitrogen | | nitrogen | |
| Nozzle diameter | 200 | | 200 | | 100 | |
| Polymer conversion ratio (mol %) | 100 | | 100 | | 100 | |
| Melted product viscosity (mPa · s) | 100 | | 45 | | 31 | |
| Continuous productivity | A | | A | | A | |
| Volume-avg. particle size (Dv)(μm) | 17.9 | | 12.9 | | 9.6 | |
| Number-avg. particle size (Dn)(μm) | 6.5 | | 6.0 | | 5.7 | |
| Dv/Dn | 2.75 | | 2.15 | | 1.68 | |
| Number-avg. molecular weight (Mn) | 18,000 | | 17,000 | | 18,000 | |
| Mw/Mn | 1.7 | | 1.6 | | 1.7 | |

Aspects of the present invention are as follows, for example.

<1> A particle manufacturing method, including:
ring-opening-polymerizing a ring-opening-polymerizable monomer after bringing the ring-opening-polymerizable monomer into contact with a first compressible fluid; and
granulating a polymer obtained in the ring-opening-polymerizing by jetting the polymer and the first compressible fluid.

<2> The particle manufacturing method according to <1>,
wherein in the granulating, the polymer is jetted with a second compressible fluid supplied to the polymer.

<3> The particle manufacturing method according to <1> or <2>,
wherein the ring-opening-polymerizable monomer is ring-opening-polymerized in the presence of a catalyst.

<4> The particle manufacturing method according to any one of <1> to <3>,
wherein a ratio of the ring-opening-polymerizable monomer converted to the polymer is 98 mol % or higher.

<5> The particle manufacturing method according to any one of <1> to <4>,
wherein the ring-opening-polymerizable monomer is brought into contact with the first compressible fluid to melt the ring-opening-polymerizable monomer.

<6> The particle manufacturing method according to <2>,
wherein the first compressible fluid includes carbon dioxide, and
wherein the second compressible fluid includes nitrogen.

<7> Particles manufactured by the particle manufacturing method according to any one of <1> to <6>,
wherein the particles are substantially free from an organic solvent.

<8> A particle manufacturing apparatus, including:
a monomer inlet configured to introduce a ring-opening-polymerizable monomer;
a compressible fluid inlet configured to introduce a compressible fluid, the monomer inlet and the compressible fluid inlet being present at one end of a path through which the ring-opening-polymerizable monomer or a polymer produced from polymerization of the ring-opening-polymerizable monomer is passed;
a nozzle configured to jet the polymer, the nozzle being present at the other end of the path; and
a catalyst inlet configured to introduce a catalyst, the catalyst inlet being present between the one end and the other end.

REFERENCE SIGNS LIST 1, 2, 3 particle manufacturing apparatus
11, 111 monomer tank
12, 22, 32, 42, 52, 112, 122, 132, 142 pump
13, 23, 33, 43, 113, 123, 133, 143 valve
64, 65, 67, 70, 80, 164, 165, 167 mixer
66, 166 reaction vessel
53, 68 back pressure valve
69 nozzle
21, 51, 121 cylinder
31, 131 catalyst tank
41, 141 additive tank
61 heater
P particles (polymer product)
PP particles (complex product)

The invention claimed is:

1. A particle manufacturing method, comprising:
polymerizing a ring-opening-polymerizable monomer after bringing the ring-opening-polymerizable monomer into contact with a first compressible fluid comprising carbon dioxide via a ring-opening polymerization to obtain a polymer; and
granulating the polymer by jetting the polymer with a second compressible fluid comprising nitrogen supplied to the polymer.

2. The method according to claim 1,
wherein the polymerizing occurs in the presence of a catalyst.

3. The method according to claim 1,
wherein a conversion ratio of the ring-opening-polymerizable monomer to the polymer is 98 mol % or higher.

4. The method according to claim 1,
wherein the ring-opening-polymerizable monomer is brought into contact with the first compressible fluid to melt the ring-opening-polymerizable monomer.

5. The method according to claim 1, wherein
the first compressible fluid consists of carbon dioxide, and
the second compressible fluid consists of nitrogen.

6. The method according to claim 1, wherein:
the polymerizing occurs in the presence of a catalyst;
a conversion ratio of the ring-opening-polymerizable monomer to the polymer is 98 mol % or higher; and
the ring-opening-polymerizable monomer is brought into contact with the first compressible fluid to melt the ring-opening-polymerizable monomer.

7. The method according to claim 6, wherein
the first compressible fluid consists of carbon dioxide, and
the second compressible fluid consists of nitrogen.

8. The method according to claim 1, wherein the ring-opening-polymerizable monomer is a cyclic ester or a cyclic carbonate and the polymer is a pressure-plastic material.

9. The method according to claim 6, wherein the ring-opening-polymerizable monomer is a cyclic ester or a cyclic carbonate and the polymer is a pressure-plastic material.

10. The method according to claim 7, wherein the ring-opening-polymerizable monomer is a cyclic ester or a cyclic carbonate and the polymer is a pressure-plastic material.